United States Patent
Govindassamy

(10) Patent No.: US 9,992,649 B1
(45) Date of Patent: Jun. 5, 2018

(54) MOBILE BROADBAND MANAGEMENT

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 107 days.

(21) Appl. No.: 15/244,547

(22) Filed: Aug. 23, 2016

(51) Int. Cl.
| | |
|---|---|
| *H04W 4/20* | (2018.01) |
| *H04W 40/02* | (2009.01) |
| *H04W 76/02* | (2009.01) |
| *H04W 84/12* | (2009.01) |
| *H04W 92/10* | (2009.01) |
| *H04W 84/04* | (2009.01) |

(52) U.S. Cl.
CPC ............ *H04W 4/20* (2013.01); *H04W 40/02* (2013.01); *H04W 76/02* (2013.01); *H04W 84/042* (2013.01); *H04W 84/12* (2013.01); *H04W 92/10* (2013.01)

(58) Field of Classification Search
None
See application file for complete search history.

(56) References Cited

U.S. PATENT DOCUMENTS

| | | |
|---|---|---|
| 6,747,977 B1 | 6/2004 | Smith et al. |
| 6,987,756 B1 | 1/2006 | Ravindranath et al. |
| 7,965,693 B2 * | 6/2011 | Jiang ........................ H04L 63/08 370/338 |
| 8,751,670 B2 | 6/2014 | Xu |
| 9,635,711 B1 | 4/2017 | Govindassamy |
| 2003/0074554 A1 | 4/2003 | Roach et al. |
| 2005/0286466 A1* | 12/2005 | Tagg .................... H04L 12/2856 370/329 |
| 2006/0080402 A1 | 4/2006 | Han et al. |
| 2007/0140195 A1 | 6/2007 | Kaftan |
| 2009/0249469 A1 | 10/2009 | Ishikawa |
| 2012/0023243 A1 | 1/2012 | Xu |
| 2012/0131215 A1 | 5/2012 | Balay et al. |

(Continued)

OTHER PUBLICATIONS

3rd Generation Partnership Project (3GPP) Technical Specification 27.007, Jun. 2016, pp. 1-7.

*Primary Examiner* — Yaotang Wang
(74) *Attorney, Agent, or Firm* — Lerner, David, Littenberg, Krumholz & Mentlik, LLP

(57) ABSTRACT

As the variety of client devices has increased and the demand for mobile broadband internet access has increased, a mobile Hotspot is commonly used. The mobile Hotspot device includes a modem for mobile broadband access and a Hotspot Access Point to distribute the internet to local devices. When accessing the internet through a mobile Hotspot, the client device may not have visibility on the status of the mobile network, the modem and the USIM/UICC. A method and apparatus are disclosed that enable a client device to connect the mobile Hotpot as a virtual mobile broadband device over a local connection when a mobile Hotspot uses AT commands. This may be used to present more detailed information to the user about the status of mobile network connection, the modem, and the USIM/UICC. This enables the user to configure and control the modem functionality which may lead to improved user experience.

20 Claims, 19 Drawing Sheets

(56) References Cited

U.S. PATENT DOCUMENTS

| | | |
|---|---|---|
| 2012/0331111 A1* | 12/2012 | Wu .................... H04W 28/065 709/219 |
| 2013/0084836 A1 | 4/2013 | Guenkova-Luy et al. |
| 2013/0090060 A1* | 4/2013 | Kim ..................... H04W 88/04 455/41.2 |
| 2014/0207991 A1 | 7/2014 | Kaushik et al. |
| 2014/0211771 A1* | 7/2014 | Kim ..................... H04W 84/12 370/338 |
| 2015/0212833 A1 | 7/2015 | Wang et al. |
| 2016/0026460 A1 | 1/2016 | Zhang et al. |
| 2016/0085577 A1 | 3/2016 | Gray |
| 2016/0124886 A1 | 5/2016 | Tian et al. |
| 2016/0143028 A1* | 5/2016 | Mancuso ................ H04L 63/20 370/338 |
| 2016/0227471 A1 | 8/2016 | De Foy et al. |
| 2016/0301573 A1 | 10/2016 | Kliger et al. |

* cited by examiner

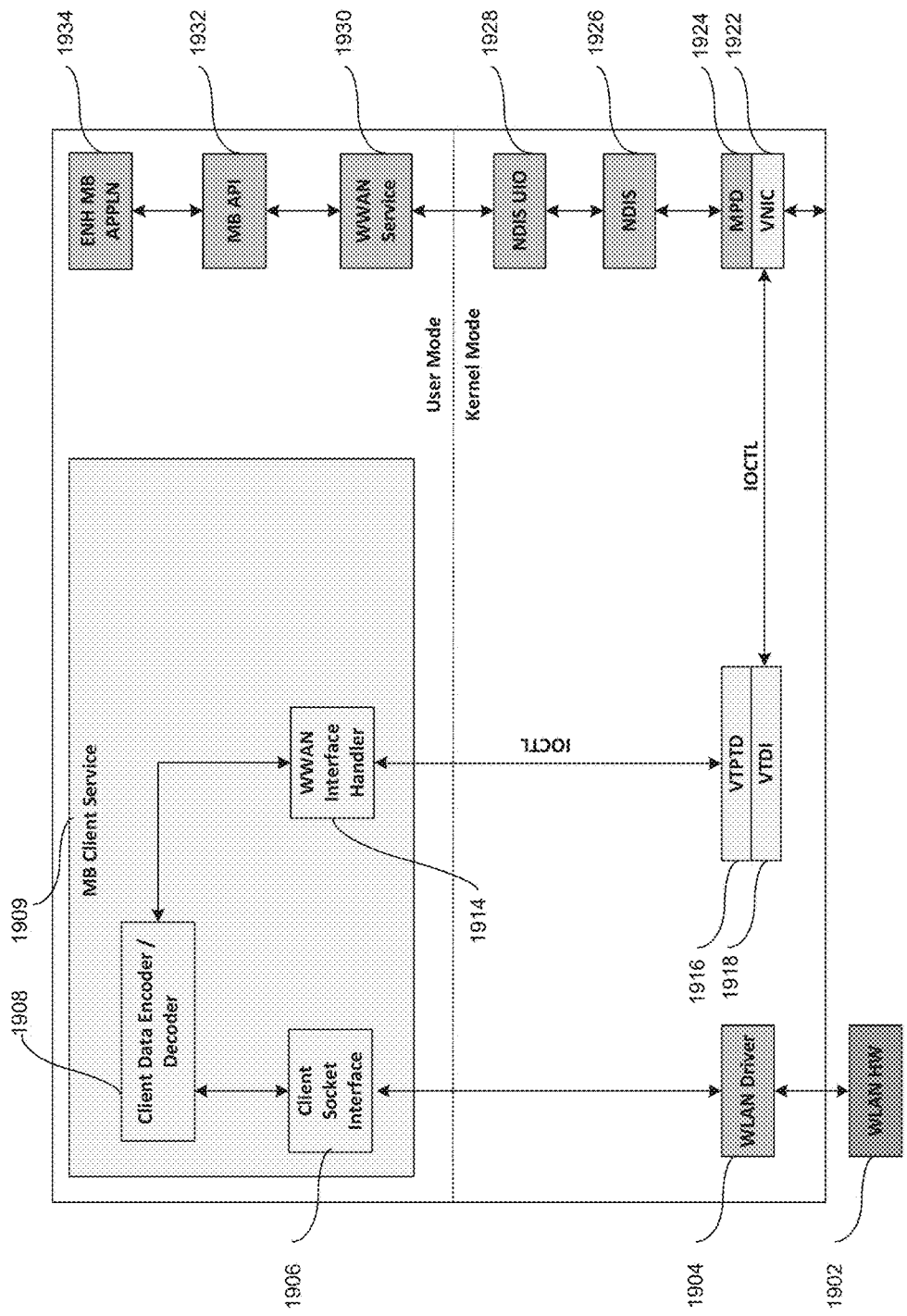

MOBILE BROADBAND MANAGEMENT

CROSS REFERENCE TO RELATED APPLICATIONS

This application is related to U.S. patent application Ser. No. 14/989,137, filed Jan. 6, 2016, which claims the benefit of the filing date of U.S. Provisional Patent Application No. 62/160,445, filed on May 12, 2015, and U.S. patent application Ser. No. 15/218,249 filed Jul. 25, 2016, the disclosures of which are hereby incorporated herein by reference.

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service provides high data transfer rates it is often referred to as broadband internet service. Broadband internet service is generally understood to be a service that is always on and offers data transfer rates on the order of mega-bits per second for both download and upload.

A client device as defined in the present disclosure is a device that may use the internet from one or more of the sources from which internet service is available. Such client devices may include conventional client devices such as a smartphone, a tablet, a feature-phone, a laptop or desktop personal computer, etc. Other client devices may include devices that are embedded within devices that perform other functions. For example, an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, industrial equipment, etc., may include a client device. These types of devices may be collectively referred herein as machine type client devices.

These diverse types of client devices may access the internet service directly through one of the sources of primary internet access as mentioned earlier. Alternatively, a client device may access the internet through a local network, which may perform distribution of the primary internet access to the users localized in a given area. Examples of such local networks include Local Area Network (LAN) using Ethernet, Wireless LAN (WLAN) commonly known as Wi-Fi, or some other local area networking schemes. When a client device is in the proximity of a location where such a LAN or WLAN access is available, it may access the internet using the LAN or WLAN. FIG. 1 illustrates an example scenario of client devices accessing the internet over a WLAN network that is connected to a traditional wire-line internet service such as a DSL or a cable modem. The local area where WLAN service is available is often referred to as Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to the DSL/cable modem through any of the standardized interfaces such as Universal Serial Bus (USB), Ethernet, or proprietary interfaces. In some cases, the DSL/cable modem and the Hotspot AP may be part of a single physical device. In such cases, the interface between the DSL/cable modem and AP may use Secure Digital Input Output (SDIO) or another suitable interface.

Client devices may also obtain internet access over mobile wireless networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

As the variety of client devices has increased and the demand for MB access has increased, a device known as a mobile Hotspot is commonly used. A mobile Hotspot device includes both a modem for MB access and a WLAN AP (Hotspot AP) to distribute the internet to local client devices. FIG. 2 illustrates the block diagram of an example mobile Hotspot device. As shown in FIG. 2, for the chosen example, the MB modem and the Hotspot AP may be connected to each other via one of the standard interfaces used in the industry such as USB, SDIO, or proprietary interfaces. In another mobile Hotspot example, the MB modem and the WLAN AP may be an Integrated Circuit (IC) as shown in FIG. 3.

Some mobile Hotspot devices may serve as a single function device, i.e., they only perform the mobile Hotspot function. Such mobile Hotspots may take many different form factors such as a mobile Hotspot integrated into an automobile, a standalone device that may be carried around with or without a battery, integrated into an accessory device such as a tablet, a standalone device that may be powered by a power wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 4. The flow of data is as shown in FIG. 4 from the mobile broadband modem to the application processor that processes the download and upload data and interacts with the user via the display and other elements of the user interface such as audio, vibration, etc. The smartphone may also have a WLAN modem to access internet service over a Hotspot AP. When it is near a Hotspot AP, it may use internet service from the Hotspot as illustrated in FIG. 1. In another smartphone example, the mobile broadband modem, the WLAN AP and the Application Processor may be an integrated device as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a client device that may have only a WLAN access. In another smartphone mobile hotspot example, the mobile broadband modem, the WLAN AP and the Application Processor may be integrated into a single IC as shown in FIG. 7.

A mobile Hotspot may be part of an accessory or peripheral device for a client device such as a tablet. Other examples of such accessory or peripheral device may include a standalone mouse, a battery pack, a cover, a stand or any other machine type client device. FIG. 8 illustrates an example scenario where a cover or a stand for a tablet includes mobile Hotspot connectivity. The mobile hotspot may be connected with the tablet client device using General Purpose Input/Output (GPIO) lines, Inter-Integrated Circuit (I2C) bus, Universal Asynchronous Receiver/Transmitter (UART), USB, SDIO, Bluetooth or any other standardized or proprietary interfaces. The data transfer and some of the control, such as power on/off, configuration, and notifications between client device and the mobile Hotspot may occur over the WLAN connection, or over any of the other available interface connection.

A client device may use a mobile Hotspot when internet access is required. A mobile Hotspot may be provided by a smartphone, by a single function mobile Hotspot device, or by an accessory such as a tablet cover that may include a mobile broadband modem and backup battery. A client device must continually search and choose the best Hotspot available.

FIG. 9 shows a block diagram 900 of example software architecture of a conventional client device for interfacing with a WLAN and with a WWAN when using an operating system (OS) that may use Mobile Broadband Interface Model (MBIM). The MBIM is specified in the Universal Serial Bus Communications Class subclass Specification for Mobile Broadband Interface Model, Revision 1.0, May 1, 2013, incorporated by reference herein. As shown in FIG. 9, the WLAN hardware (HW) block 902 may be controlled by the WLAN Device Driver block 904. The WLAN Device Driver block 904 may interface with the WLAN Application (APPLN) block 906. As shown in FIG. 9, if a WWAN HW (not shown) is connected to the client device, then it may be controlled by the Network Interface Card (NIC) Driver block 908. The NIC Device Driver block 908 interfaces with the Mini-Port Driver (MPD) block 910, which in turn interfaces with the Network Driver Interface Specification (NDIS) block 912. The NDIS block 912 interfaces with the NDIS User mode Input/Output (UIO) block 914. The NDIS UIO block 914 provides a unified interface to the WWAN Service block 916 independent of the underlying HW. The WWAN Service block 916 interfaces with the MB Application Programming Interface (API) block 918 which provides interface to all the applications such as MB application 920 which may use the MB internet service. The processing blocks 904, 908, 910, 912, and 914 operate in the Kernel mode of the OS whereas the other processing blocks operate in User mode of the OS. The MB application 920 may use the primitives defined by the MB Interface Model (MBIM) to communicate with the MB API block 918. The block diagram illustrates the control aspects of the interface with the WWAN HW. For the payload data such as pictures, videos, music, web pages, etc. to/from the MB User Interface Application 914, a conventional interface such as the Network Interface Card (NIC) may be used.

A typical client device may use a NIC Driver block 908 to send and receive the standard and non-standard MBIM commands between the MB device and the client device. The User Interface MB Application block 914 may use standard MBIM commands or user defined non-standard MBIM commands to communicate with the MB API block 918. The standard MBIM commands may be, for example, as per the Universal Serial Bus Communications Class subclass Specification for Mobile Broadband Interface Model, Revision 1.0, May 1, 2013.

When a client device, such as a tablet, receives service from a mobile Hotspot, the quality of service may vary due to a number of factors such as the signal quality of wireless communication network may fade because the user may be mobile, the congestion in the communication network, and the interruptions in data transfer during handovers, etc. Furthermore, the network access capability including roaming capability of the mobile Hotspot may be controlled by the contents of the Universal Subscriber Identity Module (USIM) that runs in the Universal Integrated Circuit Card (UICC). The UICC may be attached to the mobile broadband device such as the mobile Hotspot. The client device may not have direct access to it. Conventional client devices do not have the capability to access the wireless communication network status and the USIM/UICC status when accessing a MB network through a mobile Hotspot.

SUMMARY

A method and apparatus are disclosed that enable a client device to connect with the mobile Hotpot as a virtual mobile broadband device over a WLAN and through a Virtual Target Pass Through Driver (VTPTD) and Virtual Network Interface Card (VNIC), when the client device uses standard MBIM commands or non-standard MBIM commands to communicate with the mobile Hotspot that uses AT commands. This may be used by a client device to present more detailed information to the user about the MB network connection and that may lead to improved user experience.

In accordance with an aspect of the present disclosure, a method for virtually connecting a mobile broadband (MB) device of a mobile hotspot device with a client device through a first interface of the client device, may include: controlling, by a processing device, creating a path for routing a command control flow related packet from a first device driver of the first interface to (i) a MB application via a Wireless Wide Area Network (WWAN) Service of the client device, in which the WWAN Service is for communicatively coupling the first device driver to the MB application via a MB Application Programming Interface (API) of the client device which is communicatively coupled with the MB application and the WWAN service, or (ii) an auxiliary MB application of the client device, wherein the path includes a Client Socket Interface and a Client Data Encoder/Decoder of a MB Client Service included in the client device, wherein the Client Socket Interface is communicatively coupled with the Client Data Encoder/Decoder and the first device driver, wherein the Client Data Encoder/Decoder is communicatively coupled with a Wireless Wide Area Network (WWAN) Interface Handler of the MB Client Service, wherein the WWAN Interface Handler is for communicating with the WWAN Service via a Virtual Target Pass through Driver (VTPTD) of the client device, wherein a Virtual Target Device Interface (VTDI) of the client device is for communicating with the VTPTD and a Virtual Network Interface Card (VNIC) Device Driver, in which the VNIC device driver is included in a second device driver of the client device at a second interface of the client device, and in which the MB Client Service is for communicatively coupling the first driver with the MB application and the Auxiliary MB application, and communicating a given command control flow related packet between the first driver and the MB application or the auxiliary MB application, in which the given command control flow related packet has an AT command, a MB Interface Model (MBIM) or user defined format; controlling, by the processing device, encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional payload part; and controlling, by the processing device, determining by the Encoder/Decoder whether the given control flow packet from the first interface encoded as the VCP packet is for the WWAN interface Handler, and based on the determination controlling communication of the VCP packet to the MB application or the Auxiliary MB application.

In one alternative, a given VCP packet communicated between the MB application and the WWAN service may have a standard or non-standard AT command format.

In one alternative, a given VCP packet communicated between the Auxiliary MB application and a Client Application Interface of the MB client service, in which the Client Application Interface is communicatively coupled to the Auxiliary MB application and the Client Data Encoder/Decoder, may have a standard or non-standard MBIM command format.

In one alternative, a given VCP packet communicated between the MB application and the MB API may have a standard or non-standard MBIM command format.

In one alternative, the VCP packet may have a MBIM Command, a non-MBIM command, a standard AT command or a non-standard AT command format.

In one alternative, the Interface Header part may include a one-byte Start of Frame (SOF) field with a fixed value of 0xFE, (in hexadecimal notation), a two-byte length (LEN) field, a one-byte message identifier (MSG ID) field, a one-byte transaction identifier (TRNS ID) field, and three bytes reserved (RES) field for future use, and the payload part may have a maximum length of 65535 bytes.

In one alternative, the Auxiliary MB application may be for communication of a given VCP packet having a standard MBIM command or a non-standard MBIM command, respectively, mapped to and from a standard AT command or non-standard AT command.

In one alternative, the Auxiliary MB application may be for communication of a given VCP packet having a standard AT command or a non-standard AT command for which mapping is not performed in the data encoder/decoder.

In one alternative, the method may include controlling, by the processing device, (A) when a AT command is determined to be encoded as the VCP packet, an MBIM Command Manager of the encoder/decoder to map the AT command to an equivalent MBIM Command ID (CID) packet and provide the MBIM CID packet for routing to the WWAN Interface Handler; (B) when the MBIM CID packet is determined to be supported by the MB application, routing the MBIM CID packet from the WWAN Interface Handler to the MB application via the VTPTD, which routes the MBIM CID command packet to the WWAN service via the VTDI and the VNIC, wherein the VNIC routes the MBIM CID packet to the WWAN service via a Mini-Port Driver (MPD) of the VNIC, a Network Driver Interface Specification (NDIS) and a NDIS User mode Input/Output (UIO) of the client device, wherein the NDIS is communicatively coupled with the MPD and the NDIS UIO, wherein the NDIS UIO is communicatively coupled with the WWAN service, wherein the WWAN service routes the MBIM CID packet to the MB Application via the MB API; and (C) when the MBIM CID packet is determined not to be supported by the MB application, routing the VCP packet with the MBIM CID packet as an auxiliary MBIM packet to a Client Application Interface of the MB client service, which routes the VCP packet with the auxiliary MBIM packet to the Auxiliary MB application.

In one alternative, a Packet Router of the MS Client Service, which is communicatively coupled to the Decoder/Encoder and the WWAN Interface Handler, may route the MBIM CID packet to the WWAN Interface Handler or the auxiliary MBIM packet to the Client Application interface.

In one alternative, the method may include controlling, by the processing device, when the MB application sends a second MBIM CID packet, routing the second MBIM CID packet through the MB API, the WWAN Service, the NDIS UIO, the NIDS, the MPD, the VNIC, the VTDI and the VTPTD, to the WWAN Interface Handler, and from the WWAN Interface Handler to the Encoder/Decoder, mapping, by the Encoder/Decoder, the second MBIM CID packet to a corresponding AT command control flow VCP packet, and routing the corresponding AT command control flow VCP packet through the Client Socket Interface to the first device driver, which communicates the corresponding AT command control flow VCP packet to the mobile hotspot device over the WLAN with the corresponding AT command MBIM control flow VCP packet as a second payload part.

In one alternative, a Packet Router of the MS Client Service, which is communicatively coupled with the Decoder/Encoder and the WWAN Interface Handler, may route the second MBIM CID packet from the WWAN Interface Handler to the Encoder/Decoder.

In one alternative, the method may include: controlling, by the processing device, when the auxiliary MB application sends a second auxiliary MBIM CID packet, routing the second auxiliary MBIMCID packet to the Encoder/Decoder, mapping, by the Encoder/Decoder, the second auxiliary MBIM CID packet to a corresponding AT command control flow VCP packet, and routing the corresponding AT command control flow VCP packet through the Client Socket Interface to the first device driver, which communicates the corresponding AT command control flow VCP packet to the mobile hotspot device over the WLAN to provide Auxiliary MBIM CID information.

In one alternative, the second auxiliary MBIM CID packet may be routed through the client application interface to a Packet Router of the MS Client Service, which is communicatively coupled with the Decoder/Encoder, the WWAN Interface Handler and client application interface, and which routes the second auxiliary MBIM packet to the Encoder/Decoder.

In one alternative, the first interface may be a Wireless Local Area Network (WLAN), a Secure Digital Input Output (SDIO), a Universal Serial Bus (USB), a Universal Asynchronous Receiver/Transmitter, an Inter-Integrated Circuit (I2C) bus, or a General Purpose Input/Output (GPIO) lines interface.

In one alternative, the MB Application and the Auxiliary MB Application may be integrated into an enhanced MB Application.

In one alternative, the enhanced MB application may be coupled to the data encoder/decoder via a client application interface which is communicatively coupled to a packet router, the packet router being communicatively coupled to the data encoder/decoder and the WWAN interface handler, the packet router and the client application interface being of the MB client service.

In accordance with an aspect of the present disclosure, an apparatus for virtually connecting a mobile broadband (MB) device of a mobile hotspot device with a client device through a first interface of the client device, may include circuitry configured to control: creating a path for routing a command control flow related packet from a first device driver of the first interface to (i) a MB application via a Wireless Wide Area Network (WWAN) Service of the client device, in which the WWAN Service is for communicatively coupling the first device driver to the MB application via a MB Application Programming Interface (API) of the client device which is communicatively coupled with the MB application and the WWAN service, or (ii) an auxiliary MB application of the client device, wherein the path includes a Client Socket Interface and a Client Data Encoder/Decoder of a MB Client Service included in the client device, wherein the Client Socket Interface is communicatively coupled with the Client Data Encoder/Decoder and the first device driver, wherein the Client Data Encoder/Decoder is communicatively coupled with a Wireless Wide Area Network (WWAN) Interface Handler of the MB Client Service, wherein the WWAN Interface Handler is for communicating with the WWAN Service via a Virtual Target Pass through Driver (VTPTD) of the client device, wherein a Virtual Target Device Interface (VTDI) of the client device is for communicating with the VTPTD and a Virtual Network Interface Card (VNIC) Device Driver, in which the VNIC device driver is included in a second device driver of the client device at a second interface of the client device, and in which the MB Client Service is for communicatively coupling the first driver with the MB application and the Auxiliary MB application, and communicating a given command control flow related packet between the first driver and the MB application or the auxiliary MB application, in which the given command control flow related packet has an AT command, a MB Interface Model (MBIM) or user defined format; encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional payload part; and determining by the Encoder/Decoder whether the given control flow packet from the first interface encoded as the VCP packet is for the WWAN interface Handler, and based on the determination controlling communication of the VCP packet to the MB application or the Auxiliary MB application.

In one alternative of the apparatus, the circuitry may be configured to control, (A) when a AT command is determined to be encoded as the VCP packet, an MBIM Command Manager of the encoder/decoder to map the AT command to an equivalent MBIM Command ID (CID) packet and provide the MBIM CID packet for routing to the WWAN Interface Handler; (B) when the MBIM CID packet is determined to be supported by the MB application, routing the MBIM CID packet from the WWAN Interface Handler to the MB application via the VTPTD, which routes the MBIM CID command packet to the WWAN service via the VTDI and the VNIC, wherein the VNIC routes the MBIM CID packet to the WWAN service via a Mini-Port Driver (MPD) of the VNIC, a Network Driver Interface Specification (NDIS) and a NDIS User mode Input/Output (UIO) of the client device, wherein the NDIS is communicatively coupled with the MPD and the NDIS UIO, wherein the NDIS UIO is communicatively coupled with the WWAN service, wherein the WWAN service routes the MBIM CID packet to the MB Application via the MB API; and (C) when the MBIM CID packet is determined not to be supported by the MB application, routing the VCP packet with the MBIM CID packet as an auxiliary MBIM packet to a Client Application Interface of the MB client service, which routes the VCP packet with the auxiliary MBIM packet to the Auxiliary MB application.

In accordance with an aspect of the present disclosure, a wireless communication device may include a receiver to receive a wireless communication; and a processing device configured for virtually connecting a mobile broadband (MB) device of a mobile hotspot device with the wireless communication device through a first interface of the wireless communication. The processing device may be configured to control: creating a path for routing a command control flow related packet from a first device driver of the first interface to (i) a MB application via a Wireless Wide Area Network (WWAN) Service of the wireless communication device, in which the WWAN Service is for communicatively coupling the first device driver to the MB application via a MB Application Programming Interface (API) of the wireless communication device which is communicatively coupled with the MB application and the WWAN service, or (ii) an auxiliary MB application of the wireless communication device, wherein the path includes a Client Socket Interface and a Client Data Encoder/Decoder of a MB Client Service included in the wireless communication device, wherein the Client Socket Interface is communicatively coupled with the Client Data Encoder/Decoder and the first device driver, wherein the Client Data Encoder/Decoder is communicatively coupled with a Wireless Wide Area Network (WWAN) Interface Handler of the MB Client Service, wherein the WWAN Interface Handler is for communicating with the WWAN Service via a Virtual Target Pass through Driver (VTPTD) of the wireless communication device, wherein a Virtual Target Device Interface (VTDI) of the client device is for communicating with the VTPTD and a Virtual Network Interface Card (VNIC) Device Driver, in which the VNIC device driver is included in a second device driver of the wireless communication device at a second interface of the wireless communication device, and in which the MB Client Service is for communicatively coupling the first driver with the MB application and the Auxiliary MB application, and communicating a given command control flow related packet between the first driver and the MB application or the auxiliary MB application, in which the given command control flow related packet has an AT command, a MB Interface Model (MBIM) or user defined format; encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional payload part; and determining by the Encoder/Decoder whether the given control flow packet from the first interface encoded as the VCP packet is for the WWAN interface Handler, and based on the determination controlling communication of the VCP packet to the MB application or the Auxiliary MB application.

BRIEF DESCRIPTION OF THE DRAWINGS

FIG. 19 illustrates software architecture for a virtual MBIM interface through WLAN interface with Enhanced MB Application and single common interface according to the aspects of the present disclosure.

DETAILED DESCRIPTION

Figure 1:
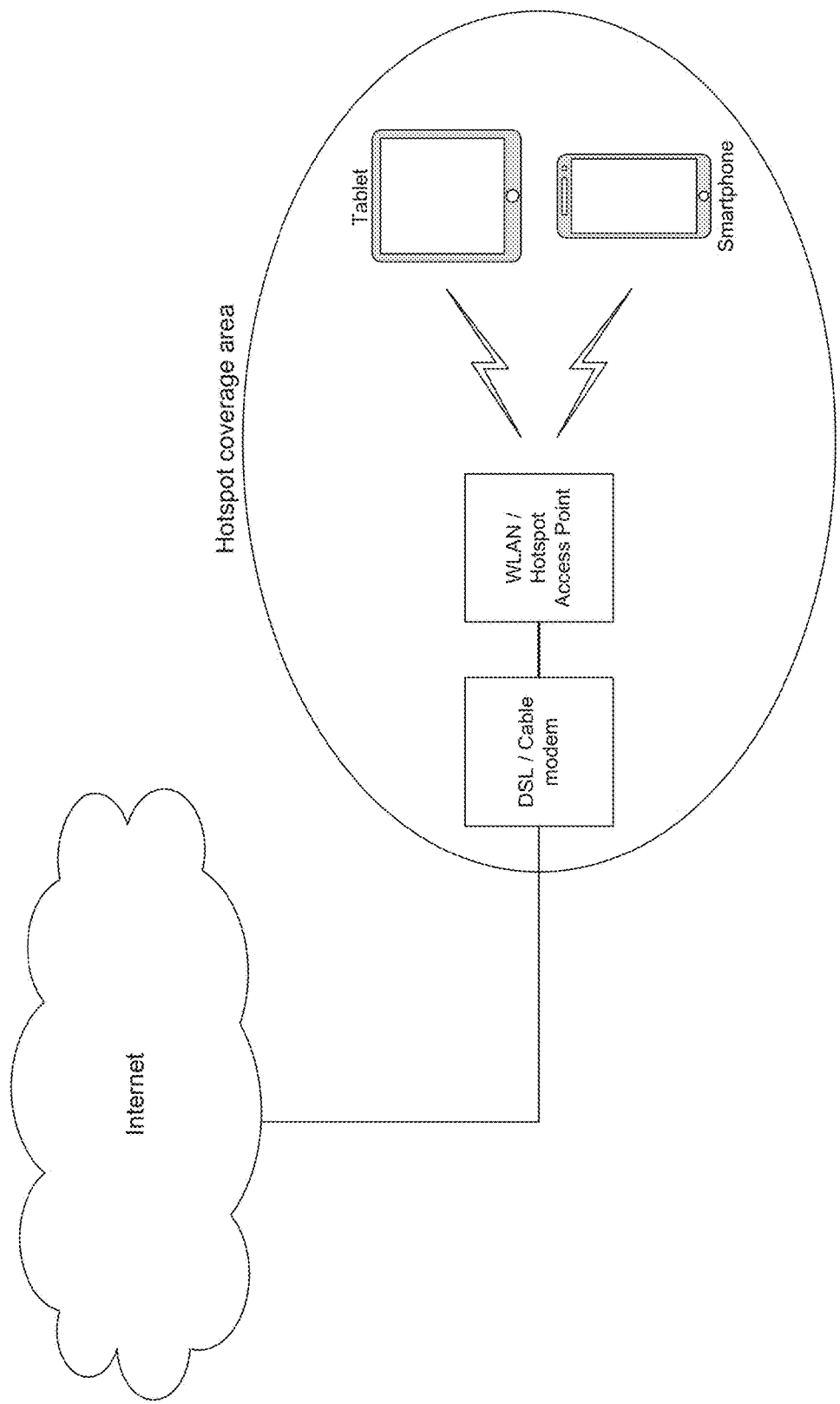
FIG. 1 illustrates an example scenario of internet access using WLAN network over a traditional wire-line internet service.
Figure 2:
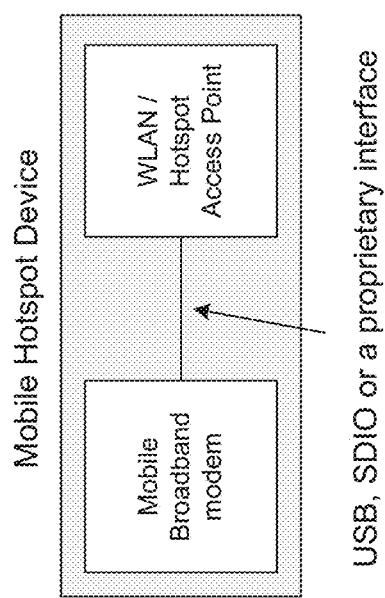
FIG. 2 illustrates a high-level block diagram of an example mobile Hotspot device.
Figure 3:
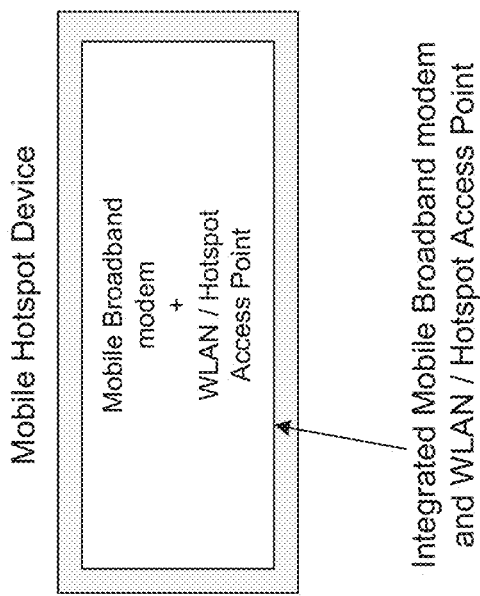
FIG. 3 illustrates a high-level block diagram of an example mobile Hotspot device with an integrated mobile broadband modem and WLAN Access Point.
Figure 4:
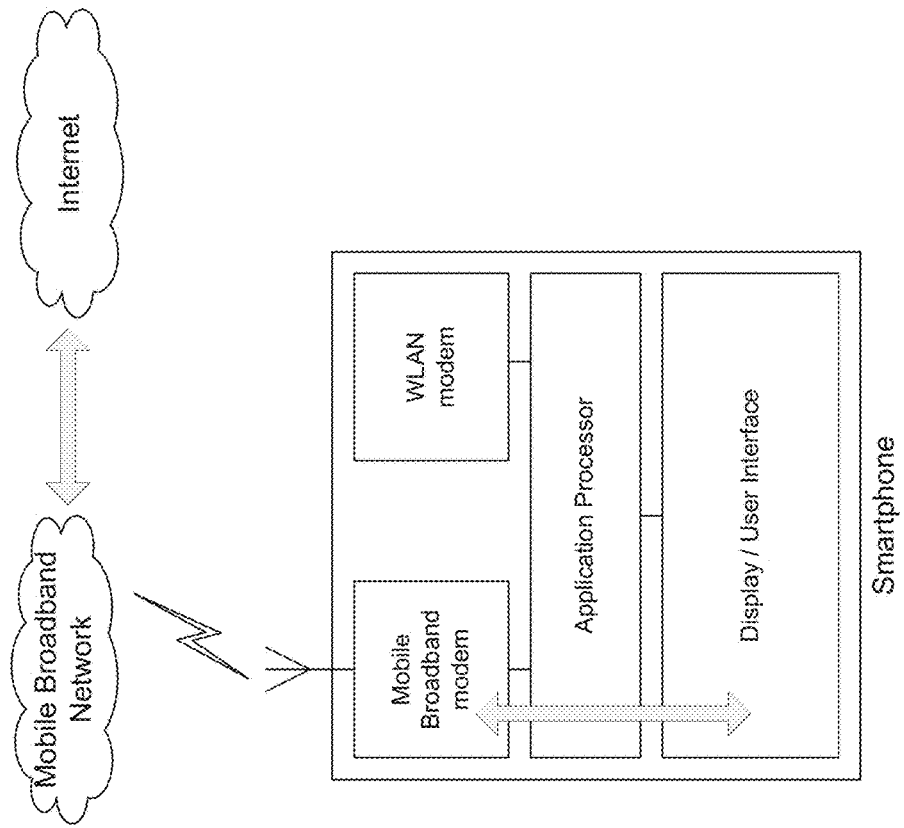
FIG. 4 illustrates a use case of internet access over a mobile broadband network by a smartphone client device.
Figure 5:
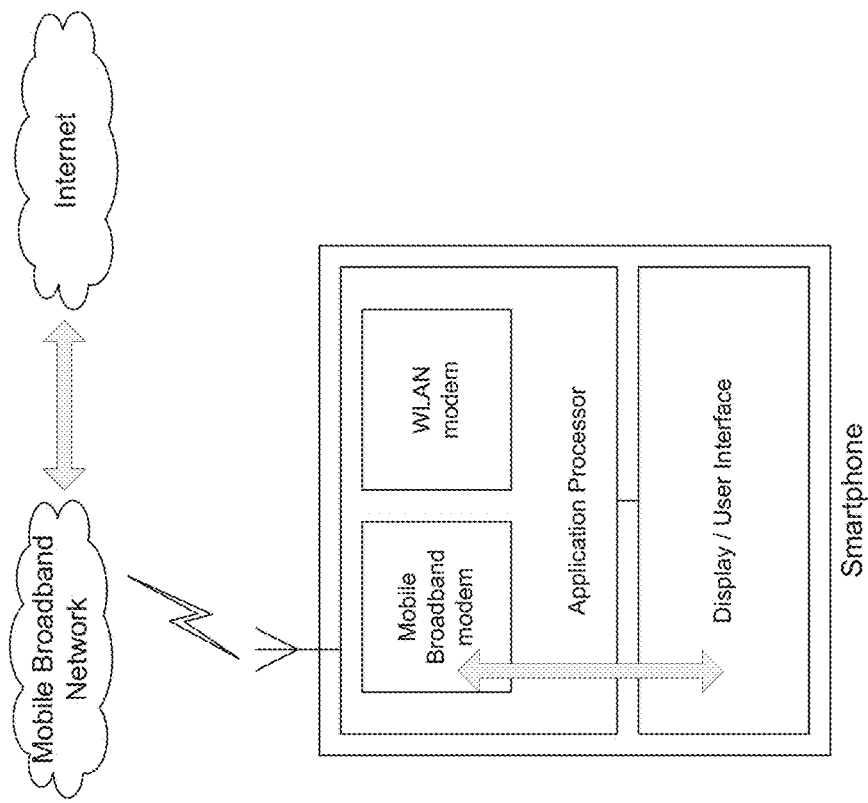
FIG. 5 illustrates a use case of internet access over a mobile broadband network by a smartphone client device with an integrated mobile broadband modem, WLAN Access Point, and Application Processor.
Figure 6:
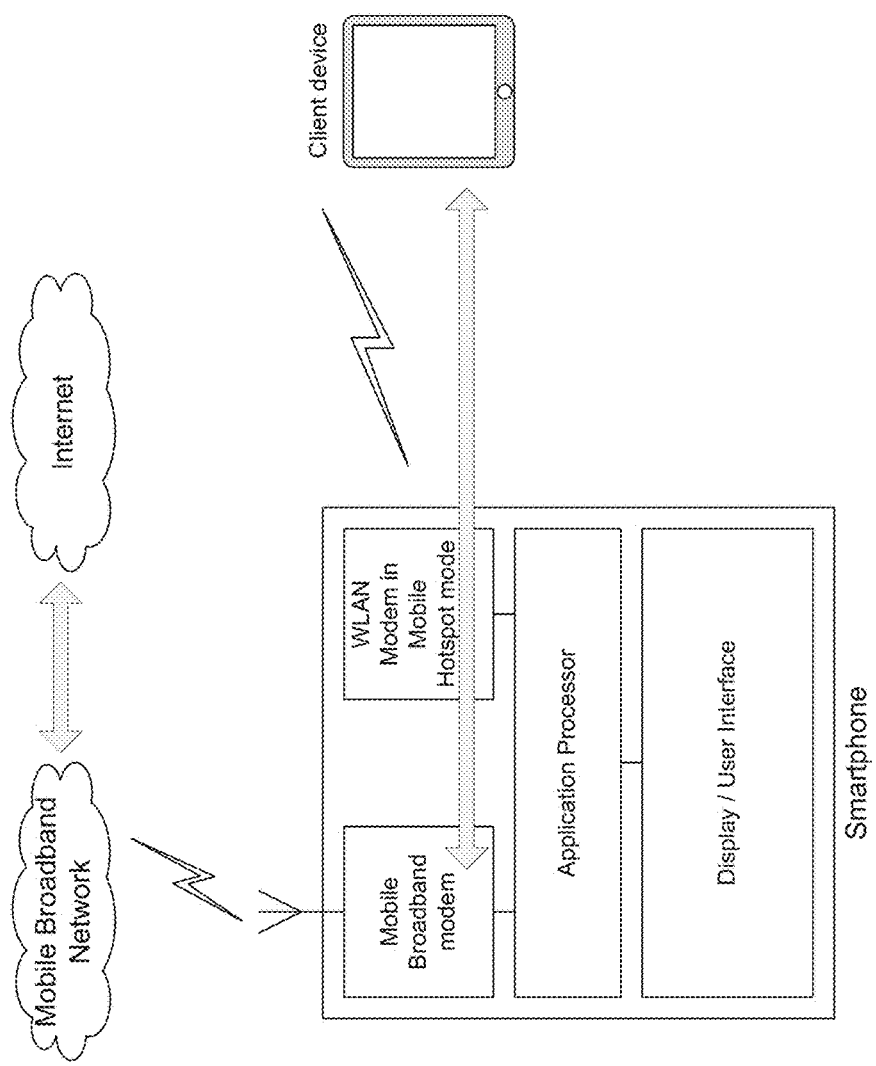
FIG. 6 illustrates a use case of internet access over a WLAN network by a client device through a smartphone operating in mobile Hotspot mode.
Figure 7:
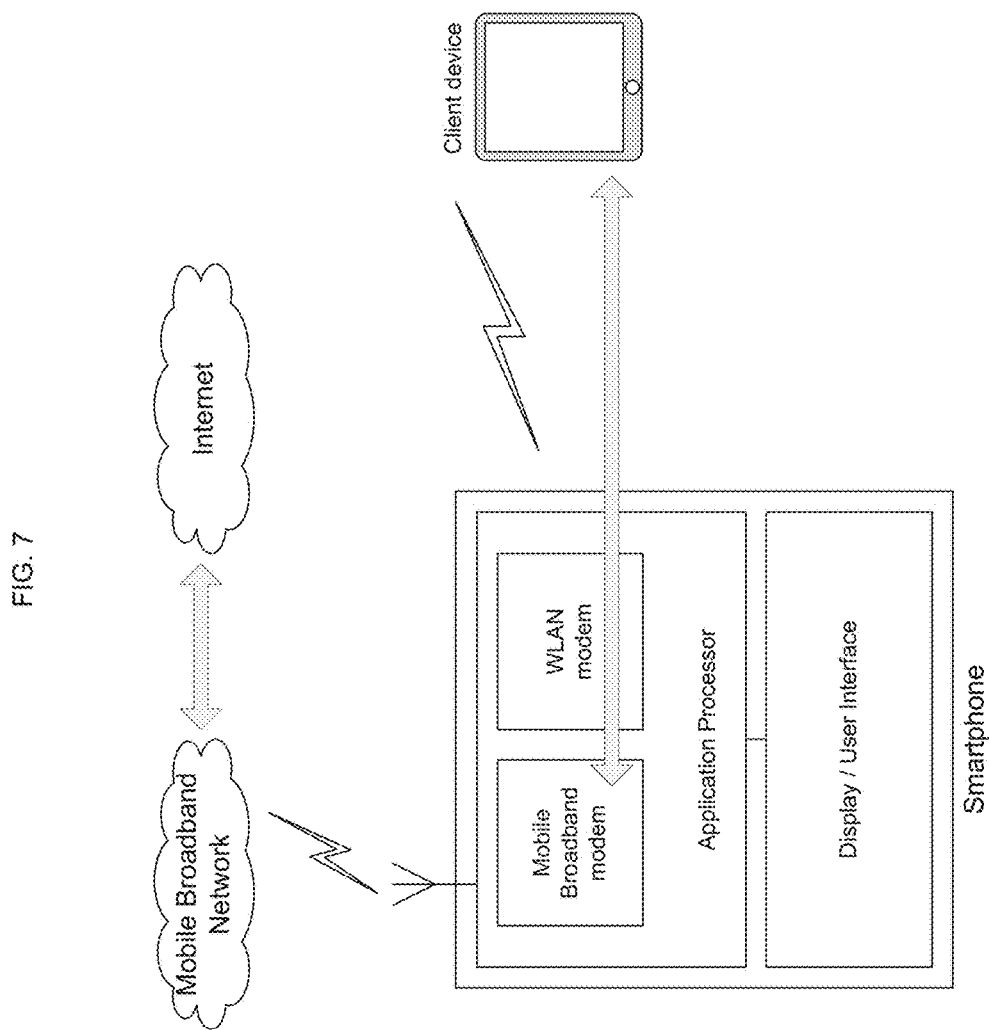
FIG. 7 illustrates a use case of internet access over a WLAN network by a client device through a smartphone operating in mobile Hotspot mode with an integrated mobile broadband modem, WLAN Access Point, and Application Processor.
Figure 8:
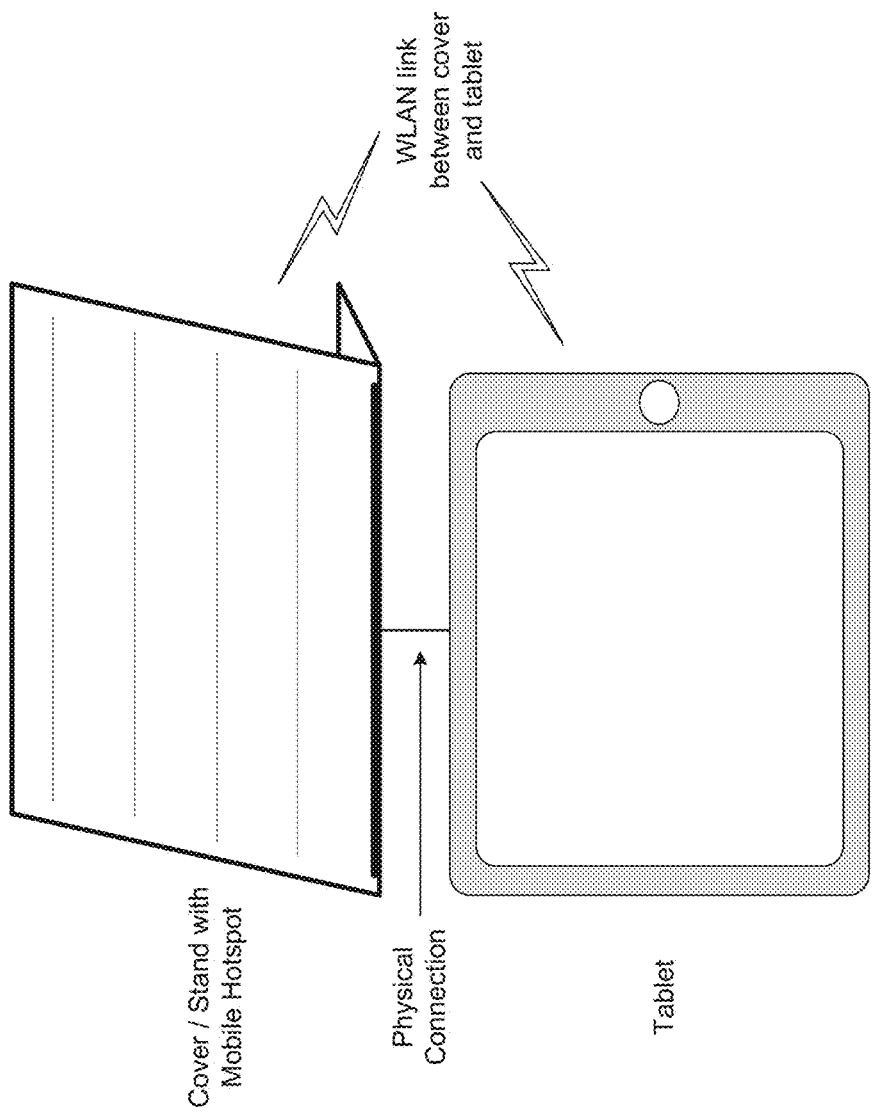
FIG. 8 illustrates a use case of tablet cover with mobile broadband modem offering internet access over a WLAN to a tablet client device and having a physical connection between the tablet and the cover.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although aspects of the present disclosure are illustrated using a particular type of client devices, the disclosure is applicable to any type of client devices some of which are listed in an earlier section in the present disclosure.

The method disclosed in the present disclosure enables the integration of a mobile Hotspot device into a client device for sending and receiving the MB device status, notification, configuration and control using the standard MBIM commands and/or non-standard MBIM commands through a VTPTD and VNIC to a mobile Hotspot device that uses AT commands.

Figure 10:
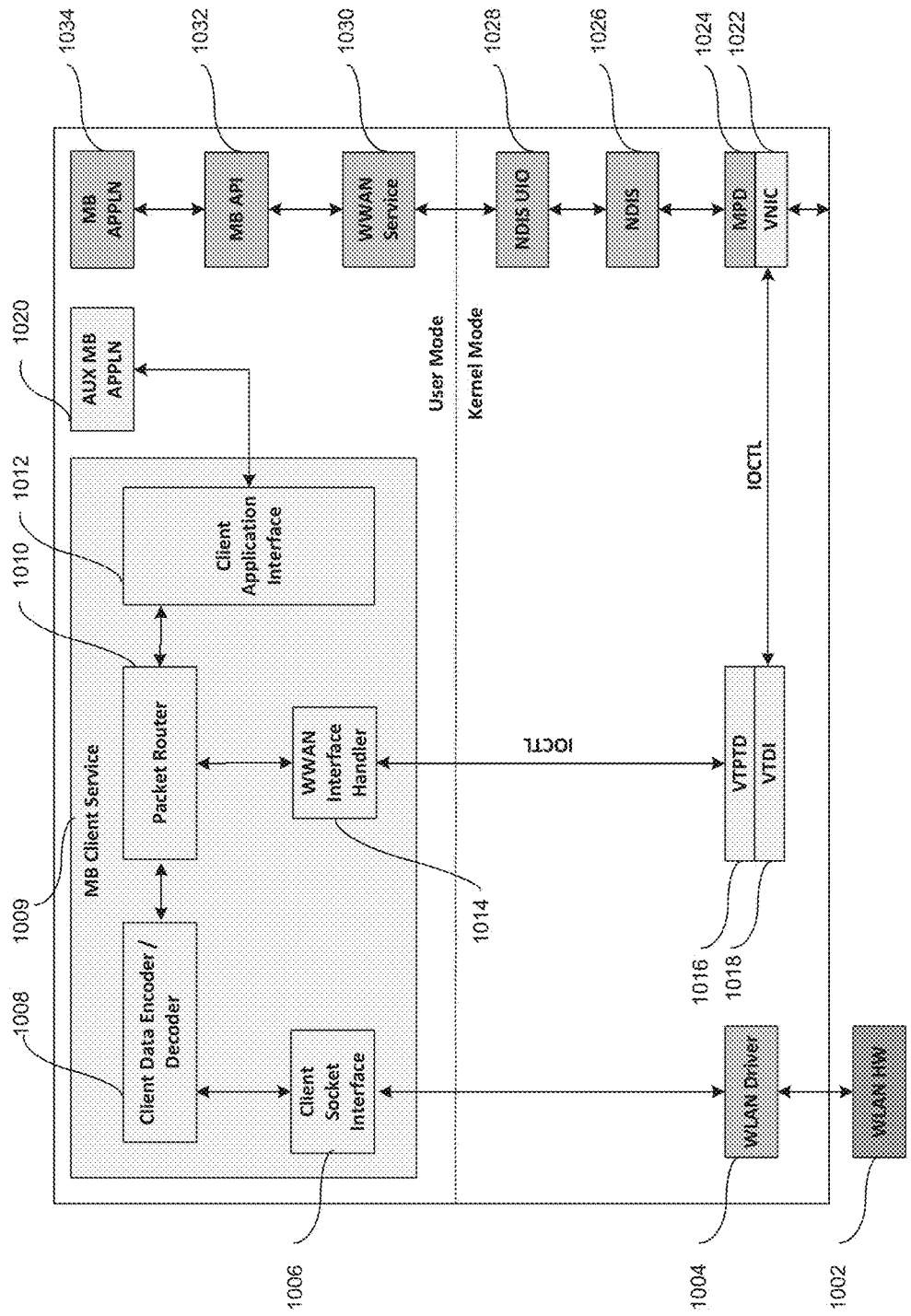
FIG. 10 illustrates software architecture for a virtual MBIM interface through WLAN interface according to the aspects of the present disclosure.

FIG. 10 shows a block diagram 1000 of the software architecture of a client device according to the aspects of the present disclosure for virtually connecting to a mobile Hotspot that may use AT commands According to an aspect of the present disclosure, the communication packets between the mobile Hotspot device and WLAN Device Driver block 1004 in the client device may be in the form of either AT commands or any user defined command formats. According to the aspects of the present disclosure, a path for routing control flow related packets from the WLAN Device Driver block 1004 to the User Interface MB Application (MB APPLN) block 1034 and Auxiliary MB Application (AUX MB APPLN) block 1020 may be created although there is no MB device directly connected to the client device. The control flow related packets between the User Interface MB Application block 1034 and MB API block 1032 may be in the form of standard MBIM commands and/or non-standard MBIM commands. The control flow related packets between the AUX MB Application block 1020 and Client Application Interface block 1012 may be in the form of standard MBIM commands and/or non-standard MBIM commands According to the aspects of the present disclosure, a new subsystem referred herein as MB Client Service block 1009 may be created which comprises the processing blocks Client Socket Interface 1006, Client Data Encoder/Decoder/MBIM Command Manager block 1008, Packet Router block 1010, the Client Application Interface block 1012, and WWAN Interface Handler block 1014.

Figure 11:
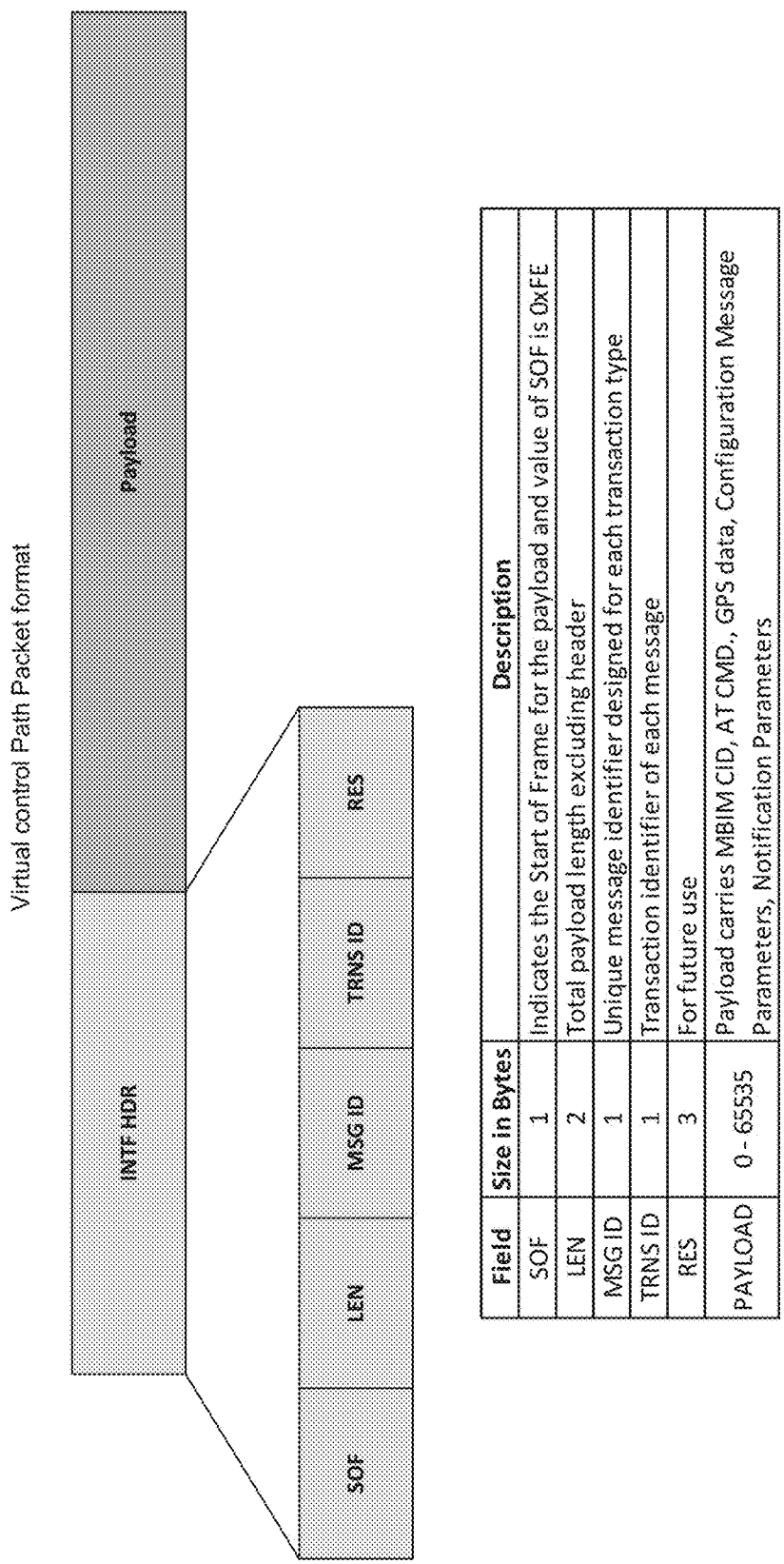
FIG. 11 illustrates the header format for mobile broadband network information transport over different media according to the aspects of the present disclosure.

The control request packets may be encoded with a header format, as illustrated in FIG. 11, by the Client Data Encoder/Decoder/MBIM Command Manager block 1008. The format comprises an Interface Header part (INTF HDR) and the Payload part. The Interface Header part further comprises a one-byte Start of Frame (SOF) field with a fixed value of 0xFE (in hexadecimal notation), a two-byte length (LEN) field, a one-byte message identifier (MSG ID) field, a one-byte transaction identifier (TRNS ID) field, and three bytes reserved (RES) field for future use. The payload part may be absent or present with a maximum length of 65535 bytes. An MBIM or non-MBIM or standard AT commands or non-standard AT commands or user defined command formatted control path packet encoded using the format as described above is referred herein as Virtual Control Path (VCP) packet. A non-standard MBIM control path packet is referred herein as Auxiliary MBIM packet. The non-standard Command IDs (CIDs) associated with the Auxiliary MBIM packets are referred herein as Auxiliary MBIM CIDs. The standard or non-standard MBIM commands from the AUX MB APPLN block 1020 may be mapped to standard AT commands or non-standard AT commands respectively. The AUX MB APPLN block 1020 may also use standard AT commands or non-standard AT commands which may not require any mapping in the Client Data Encoder/Decoder/MBIM Command Manager block 1008. According to the aspects of the present disclosure, the WLAN Device Driver block 1004 interfaces with the Client Socket Interface block 1006. The VCP packets to and from the Hotspot device are routed by the WLAN Device Driver block 1004 to the Client Socket Interface 1006. The Client Socket Interface block 1006 communicates with the Client Data Encoder/Decoder/MBIM Command Manager block 1008, which determines whether the VCP packet is for WWAN interface or for other purpose. According to the aspects of the present disclosure, the "MBIM Command Manager" module present in the block 1008 may perform the mapping of the AT commands to the corresponding MBIM CID requests/responses/indications/configurations and presents them to the Packet Router block 1010. If the mapped MBIM Command ID (CID) from the extracted packet is supported by the native User Interface MB Application 1034, the MBIM packet is routed to the WWAN Interface Handler 1014. The WWAN Interface Handler block 1014 sends the MBIM CIDs to the Virtual Target Pass Through Driver (VTPTD) block 1016 using the device input output control protocol supported by the operating system. Through these input output control protocol interface an application may communicate directly with the device driver. The VTPTD block 1016 interfaces with the Virtual Target Device Interface (VTDI) block 1018 which in turn interfaces with the Virtual Network Interface Card (VNIC) block 1022. The VNIC block 1022 provides a NIC type of interface to the mobile broadband device and makes the remote mobile broadband device appear to the MB application 1034 as if it was locally attached to the client device. From this point forward the MB packets from the WLAN Device Driver block 1004 may be routed to the MB application 1034 as described earlier. This packet flow enables the MB application using MBIM CIDs to have a virtual MB device connected to it over a WLAN network even when the mobile Hotspot device and the MB modem device use AT commands Using this capability, the MB application 1034 may be able to query the MB modem in the mobile Hotspot about the WWAN network conditions, USIM/UICC information, and other features as if having a MB modem virtually connected to the client device.

If the mapped MBIM CIDs from the extracted packet are not supported by the native User Interface MB Application 1034, the Packet Router block 1010 may route the Auxiliary MBIM packet to the Client Application Interface 1012. The Client Application Interface 1012 in turn may communicate with the AUX MB APPLN 1020. The AUX MB APPLN 1020 enables user interface configuration and provides notification of Auxiliary MBIM indications.

Similarly, when the User Interface MB Application block 1034 sends MBIM CIDs to the MB API block 1032, it may route them to the WWAN Service block 1030 which in turn may route them to the NDIS UIO block 1028. The NDIS UIO block 1028 may route the MBIM CIDs to the NDIS block 1026 which in turn may route them to the MPD block 1024 and then to the VNIC block 1022. Next, the VNIC block 1022 may route the MBIM CIDs to the VTDI block 1018 and then to the VTPTD block 1016 which in turn may route them to the WWAN Interface Handler block 1014. Next, the WWAN Interface Handler block 1014 may route the MBIM CIDs to the Packet Router block 1010 which may route the MBIM commands to the Client Data Encoder/Decoder/MBIM Command Manager block 1008. According to the aspects of the present invention, the Client Data Encoder/Decoder/MBIM Command Manager block 1008 maps the MBIM CIDs to the corresponding AT commands control flow VCP packets. Next, the Client Data Encoder/Decoder/MBIM Command Manager block 1008 may provide the VCP packets to the Client Socket Interface block 1006 which interfaces with the WLAN Driver 1004. The WLAN Driver 1004 communicates with the mobile Hotspot over the WLAN with VCP packets as the payload. This packet flow enables the User interface MB Application to have a virtual MB device connected to it over a WLAN network. The MB application 1034 may be able to query the MB modem in the mobile Hotspot about the WWAN network conditions, USIM/UICC information, and other features as of having a MB modem virtually connected to the client device.

When the AUX MB Application block 1020 sends Auxiliary MBIM CIDs to the Client Application Interface block 1032, they are routed to the Packet Router block 1010 which in turn may route them to the Client Data Encoder/Decoder/MBIM Command Manager block 1008. According to the aspects of the present invention, the "MBIM Command Manager" module in the block 1008 maps the Auxiliary MBIM CIDs to corresponding AT commands and encapsulates them into a VCP packet. It then routes the VCP packet to the Client Socket Interface 1006 which may route them to the WLAN Driver block 1004 for transmission over WLAN to the MB modem connected to the mobile Hotspot. The AUX MB APPLN 1020 enables user interface configuration and provides notification of Auxiliary MBIM indications.

Figure 12:
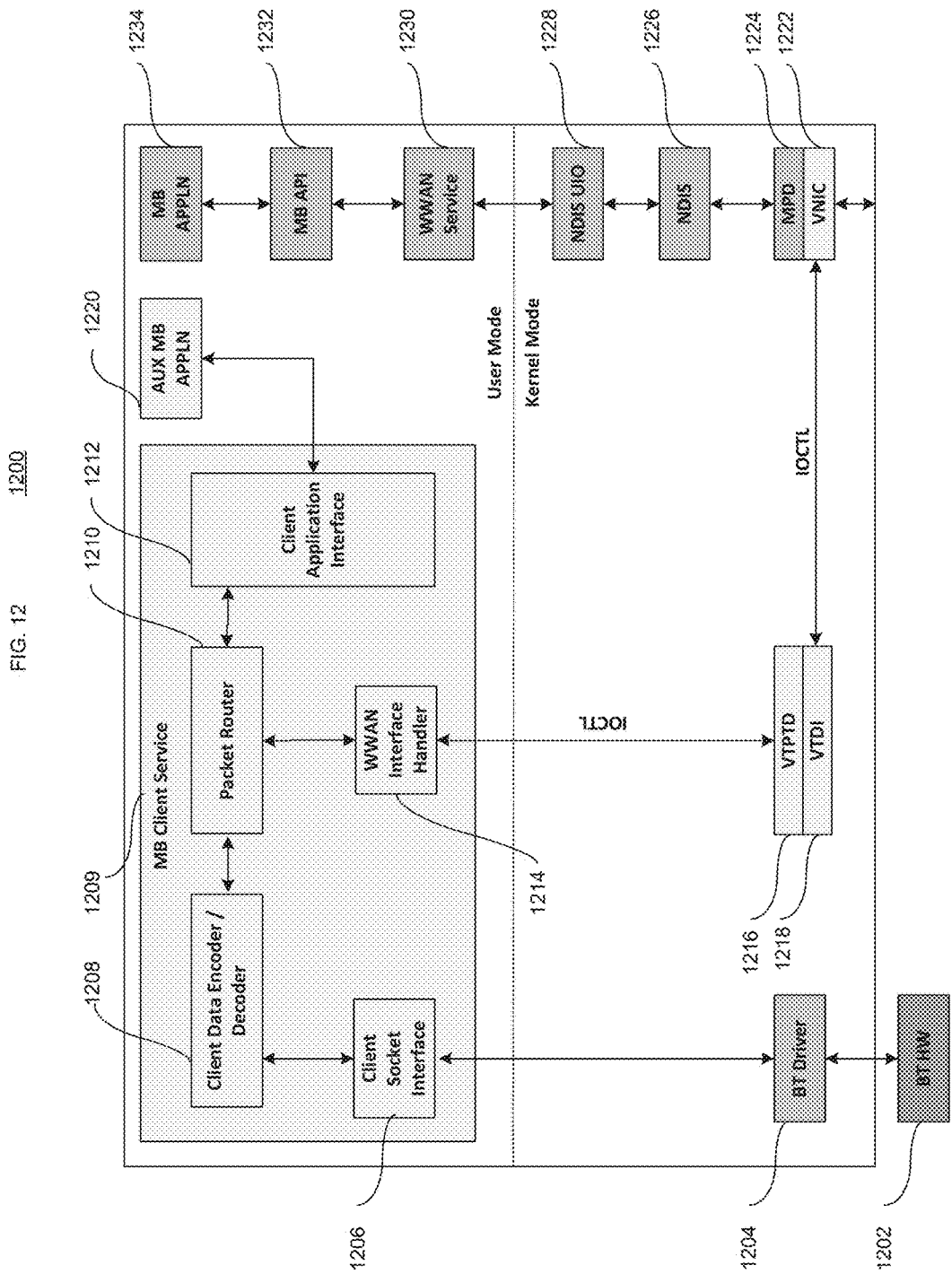
FIG. 12 illustrates software architecture for a virtual MBIM interface through Bluetooth interface according to the aspects of the present disclosure.
Figure 13:
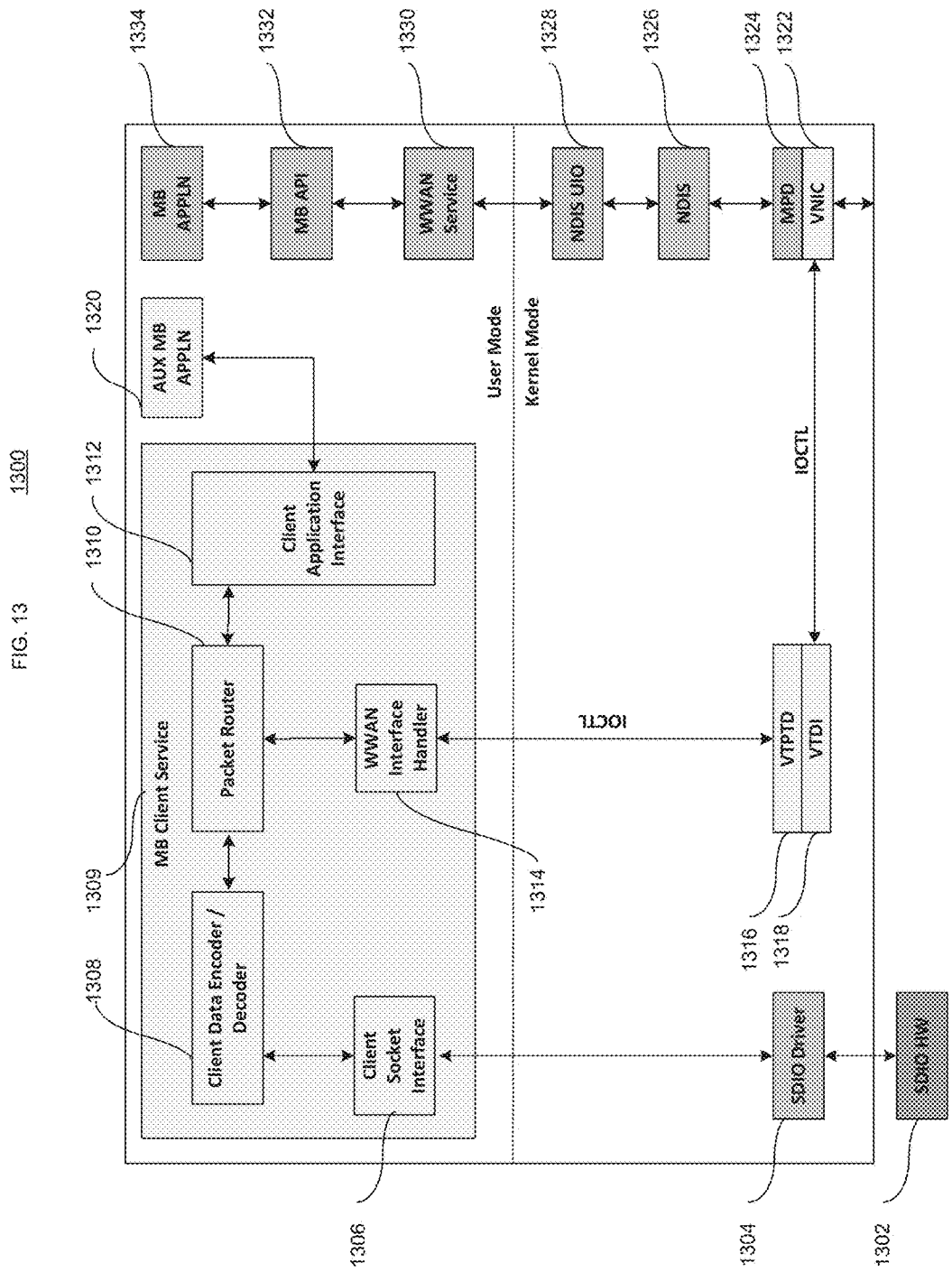
FIG. 13 illustrates software architecture for a virtual MBIM interface through SDIO interface according to the aspects of the present disclosure.
Figure 14:
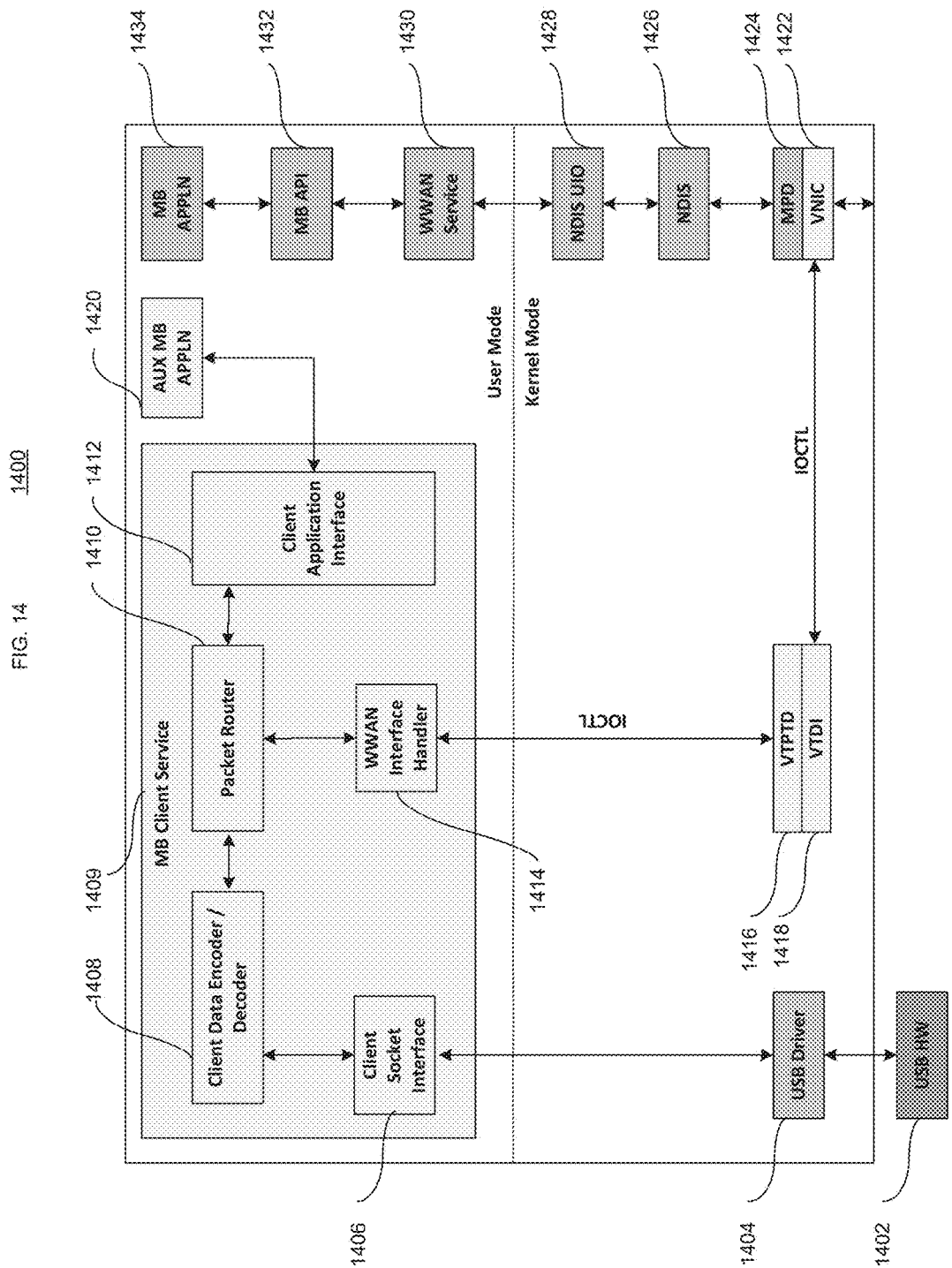
FIG. 14 illustrates software architecture for a virtual MBIM interface through USB interface according to the aspects of the present disclosure.
Figure 15:
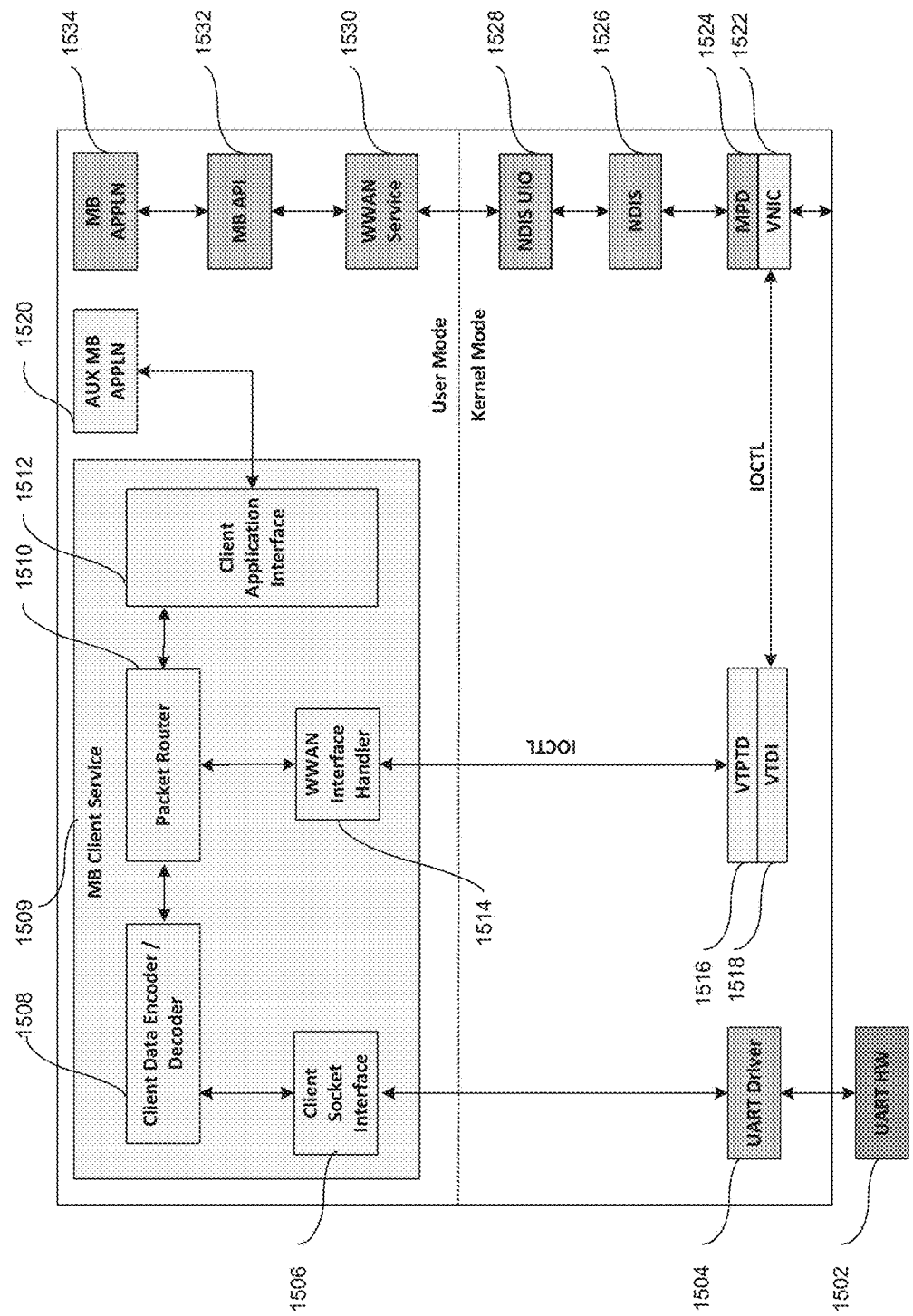
FIG. 15 illustrates software architecture for a virtual MBIM interface through UART interface according to the aspects of the present disclosure.
Figure 16:
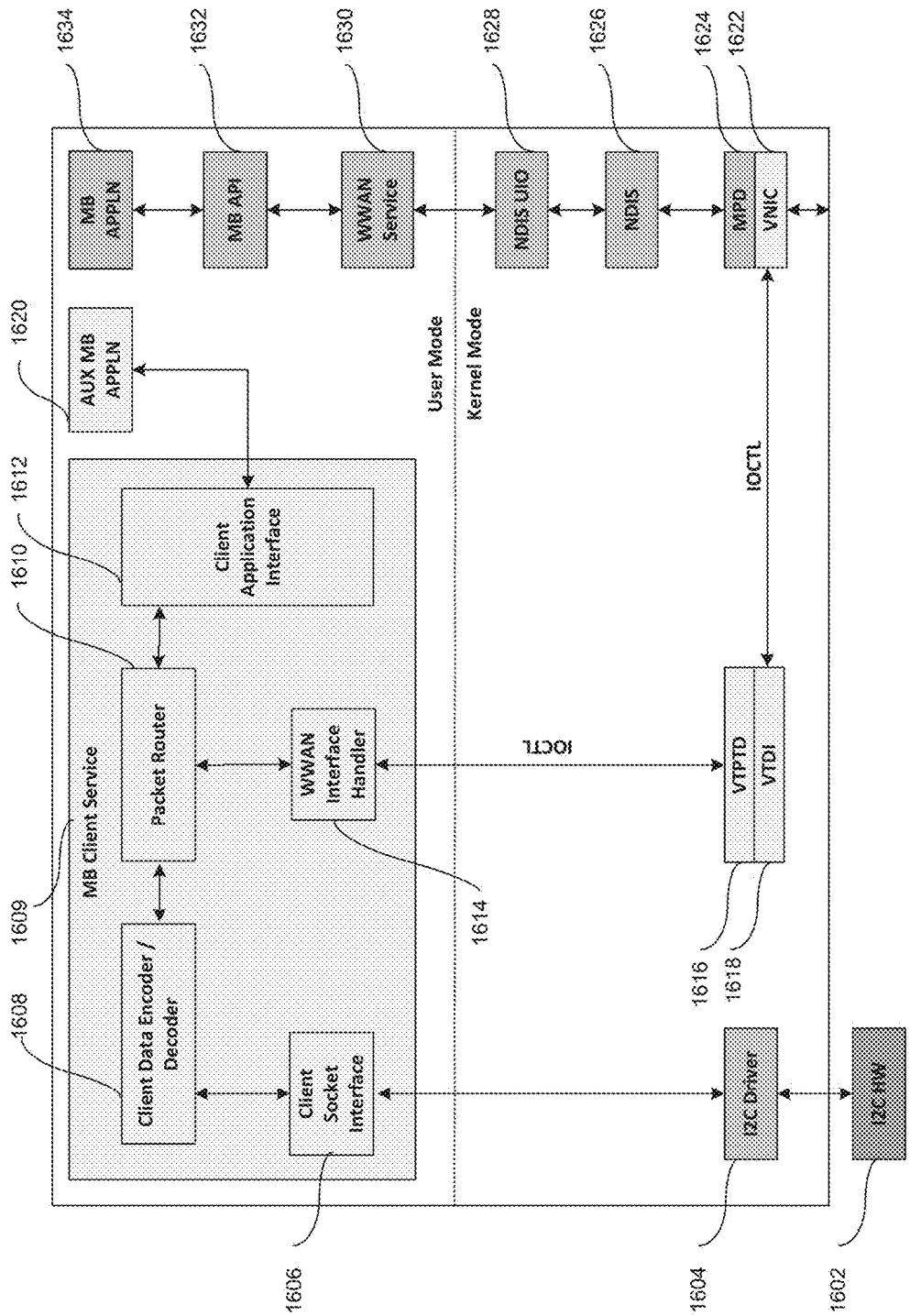
FIG. 16 illustrates software architecture for a virtual MBIM interface through I2C interface according to the aspects of the present disclosure.
Figure 17:
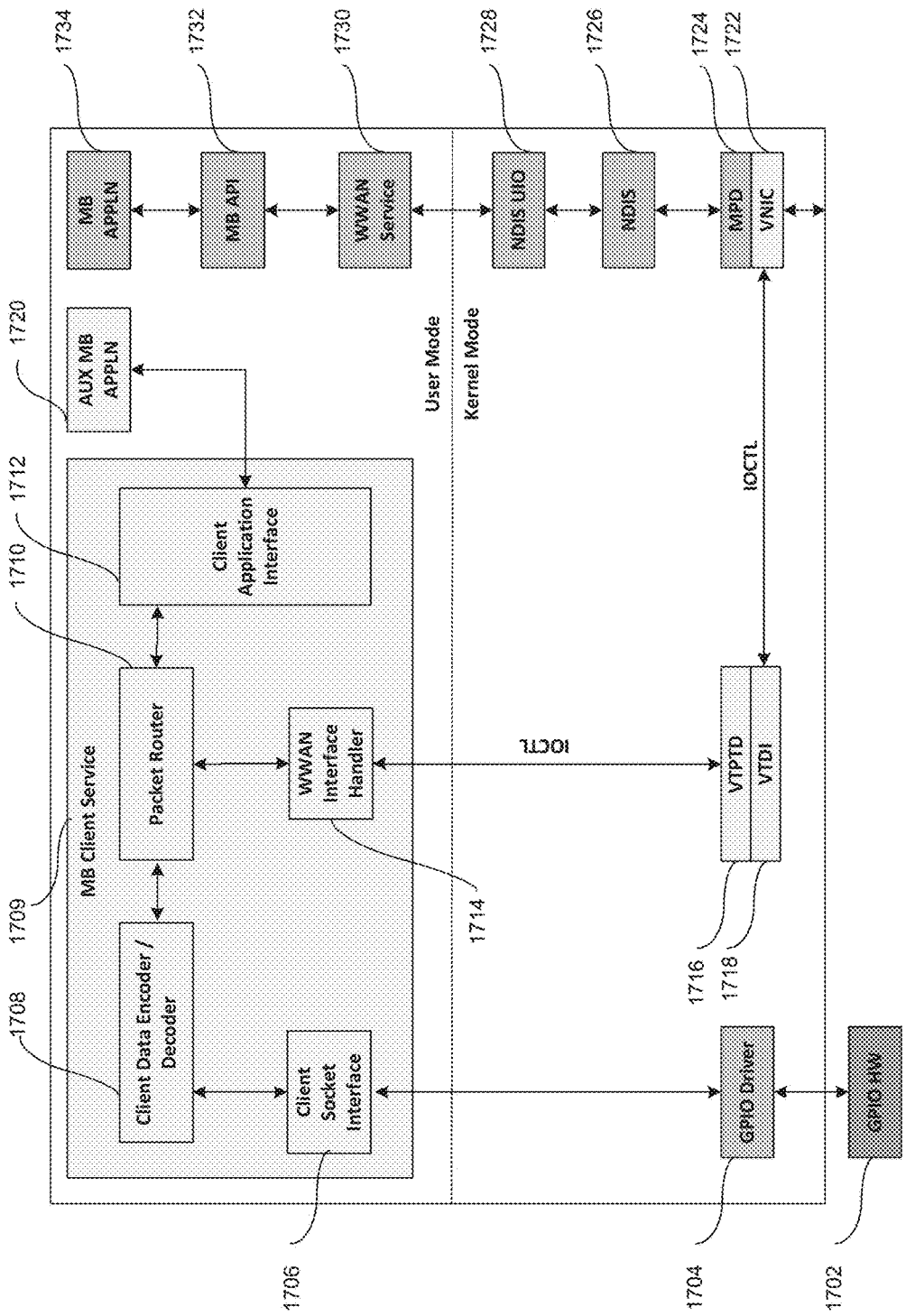
FIG. 17 illustrates software architecture for a virtual MBIM interface through GPIO interface according to the aspects of the present disclosure.

Although the description of the present disclosure for virtually connecting a MB modem to a client device is described using the WLAN interface as an example, the same function may be implemented using other interfaces. FIG. 12 shows a block diagram 1200 of the software architecture of a client device according to the aspects of the present disclosure for virtually connecting a MB modem over Bluetooth (BT) interface between the hotspot device and the client device. FIG. 13 shows a block diagram 1300 of the software architecture of a client device according to the aspects of the present disclosure for virtually connecting a MB modem over an SDIO interface between the hotspot device and the client device. FIG. 14 shows a block diagram 1400 of the software architecture of a client device according to the aspects of the present disclosure for virtually connecting a MB modem over a USB interface between the hotspot device and the client device. Note that although a MB modem with USB interface can directly connect to a client device, there may be devices such as a Customer Premise Equipment (CPE) that may have the MB modem embedded inside them but do not expose the MB modem directly to a client device. In this scenario, the client device may connect to a CPE through USB and then virtually connect to the MB modem inside the CPE according to the aspects of the present disclosure. FIG. 15 shows a block diagram 1500 of the software architecture of a client device according to the aspects of the present disclosure for virtually connecting a MB modem over a UART interface between the hotspot device and the client device. FIG. 16 shows a block diagram 1600 of the software architecture of a client device according to the aspects of the present disclosure for virtually connecting a MB modem over an I2C interface between the hotspot device and the client device. FIG. 17 shows a block diagram 1700 of the software architecture of a client device according to the aspects of the present disclosure for virtually connecting a MB modem over GPIO interface between the hotspot device and the client device. According to the aspects of the present disclosure, MB modem may be virtually connected to a client device over any standard based or proprietary communication interface.

Figure 18:
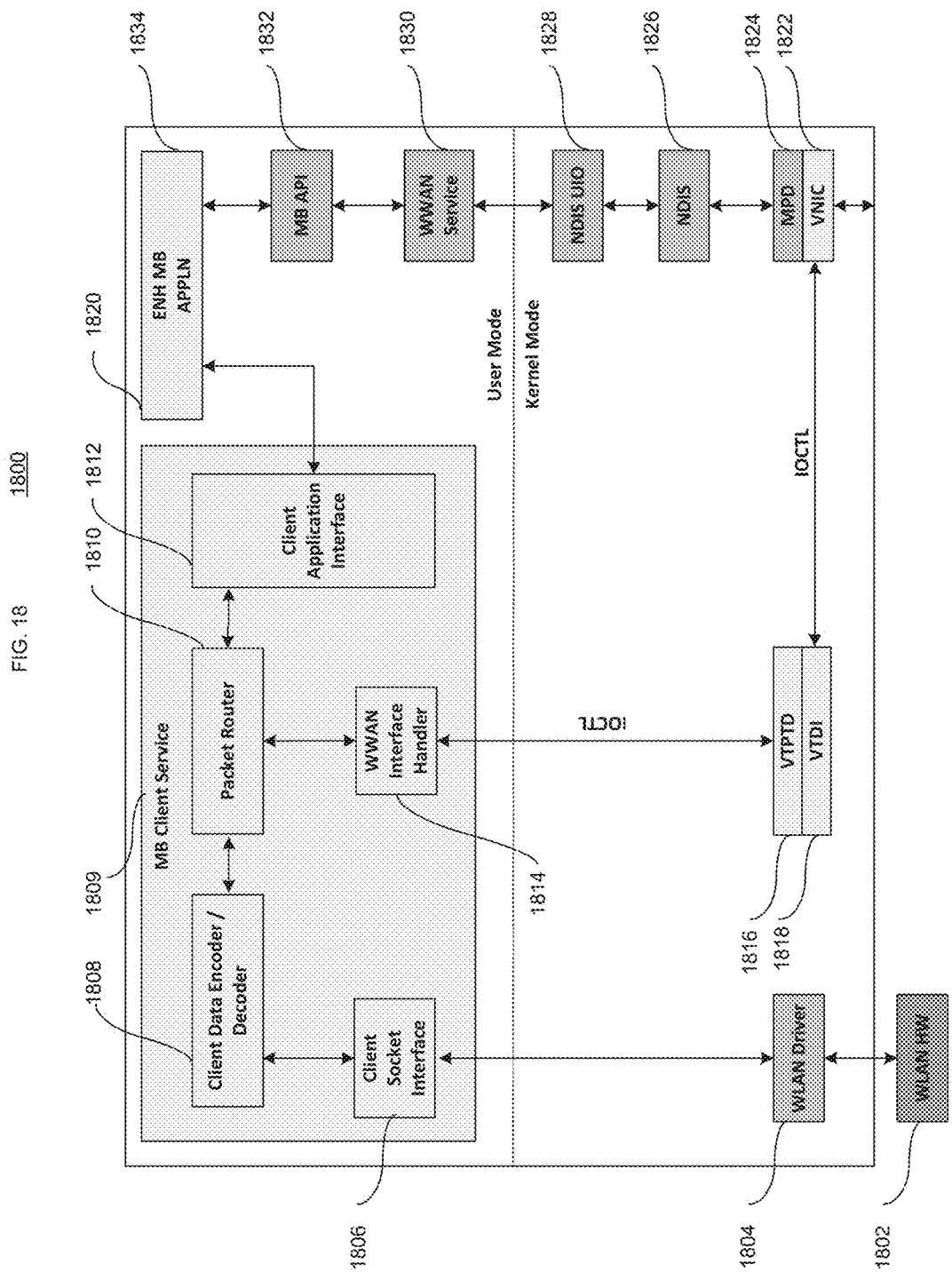
FIG. 18 illustrates software architecture for a virtual MBIM interface through WLAN interface with Enhanced MB Application and two interfaces for standard MBIM CIDs and non-standard MBIM CIDs according to the aspects of the present disclosure.

The AUX MB APPLN 1020 and the MB APPLN 1034 in FIG. 10 may be integrated into a new Enhanced MB Application (ENH MB APPLN) 1834 as shown in FIG. 18. The processing block Packet Router 1810 and the processing block Client Application Interface 1812 may be removed and the Client Data Encoder/Decoder/MBIM Command Manager block 1808 may directly interface with WWAN Interface Handler 1814. This is illustrated in FIG. 19. The ENH MB APPLN 1934 may now communicate all the MBIM and Auxiliary MBIM CIDs through a single common interface with the MB API 1932. The baseline MBIM CIDs and the Auxiliary MBIM CID may be collectively referred to as Enhanced MBIM CIDs.

Figure 9:
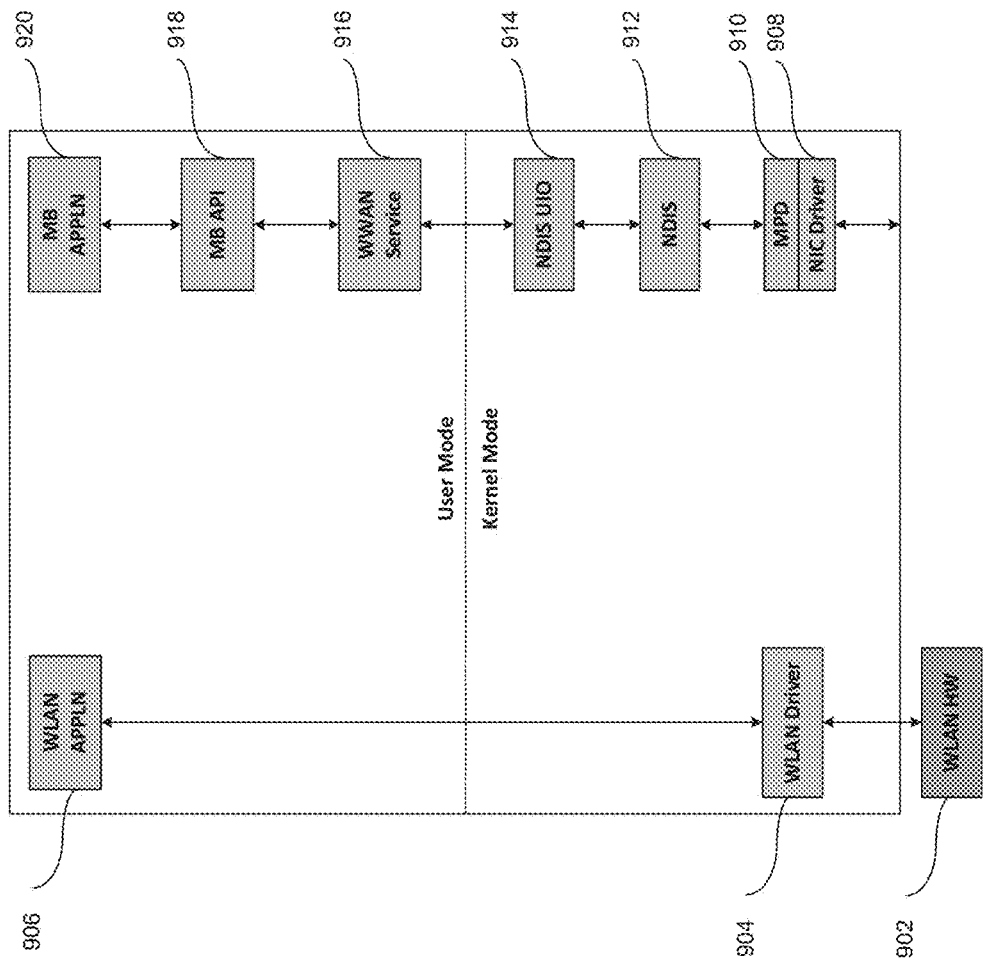
FIG. 9 illustrates conventional software architecture for a WLAN and Ethernet connection in a client device.

The mobile Hotspot may be initially configured using the client device. A client device may provide the required software drivers and updates to enable the mobile Hotspot to process the new MBIM CIDs and other new message formats. The initial configuration of the mobile Hotspot may be done using the conventional method of communication between the mobile Hotspot and the client device as shown in FIG. 9. After the mobile Hotspot is configured, the client device may start using the new MBIM CIDs to virtually connect the mobile Hotspot to the client device over WLAN interface.

The invention claimed is:

1. A method for virtually connecting a mobile broadband (MB) device of a mobile hotspot device with a client device through a first interface of the client device, the method comprising:
controlling, by a processing device, creating a path for routing a command control flow related packet from a first device driver of the first interface to (i) a MB application via a Wireless Wide Area Network (WWAN) Service of the client device, in which the WWAN Service is for communicatively coupling the first device driver to the MB application via a MB Application Programming Interface (API) of the client device which is communicatively coupled with the MB application and the WWAN service, or (ii) an auxiliary MB application of the client device,
wherein the path includes a Client Socket Interface and a Client Data Encoder/Decoder of a MB Client Service included in the client device, wherein the Client Socket Interface is communicatively coupled with the Client Data Encoder/Decoder and the first device driver,
wherein the Client Data Encoder/Decoder is communicatively coupled with a Wireless Wide Area Network (WWAN) Interface Handler of the MB Client Service, wherein the WWAN Interface Handler is for communicating with the WWAN Service via a Virtual Target Pass through Driver (VTPTD) of the client device,
wherein a Virtual Target Device Interface (VTDI) of the client device is for communicating with the VTPTD and a Virtual Network Interface Card (VNIC) Device Driver, in which the VNIC device driver is included in a second device driver of the client device at a second interface of the client device, and
in which the MB Client Service is for communicatively coupling the first device driver with the MB application and the Auxiliary MB application, and communicating a given command control flow related packet between the first device driver and the MB application or the auxiliary MB application, in which the given command control flow related packet has an AT command, a MB Interface Model (MBIM) or user defined format;
controlling, by the processing device, encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional payload part; and
controlling, by the processing device, determining by the Client Data Encoder/Decoder whether the given control flow packet from the first interface encoded as the VCP packet is for the WWAN interface Handler, and based on the determination controlling communication of the VCP packet to the MB application or the Auxiliary MB application.

2. The method of claim 1, wherein a given VCP packet communicated between the MB application and the WWAN service has a standard or non-standard AT command format.

3. The method of claim 1, wherein a given VCP packet communicated between the Auxiliary MB application and a Client Application Interface of the MB client service, in which the Client Application Interface is communicatively coupled to the Auxiliary MB application and the Client Data Encoder/Decoder, has a standard or non-standard MBIM command format.

4. The method of claim 1, wherein a given VCP packet communicated between the MB application and the MB API has a standard or non-standard MBIM command format.

5. The method of claim 1, wherein the VCP packet has a MBIM Command, a non-MBIM command, a standard AT command or a non-standard AT command format.

6. The method of claim 1,
wherein the Interface Header part includes a one-byte Start of Frame (SOF) field with a fixed value of 0xFE (in hexadecimal notation), a two-byte length (LEN) field, a one-byte message identifier (MSG ID) field, a one-byte transaction identifier (TRNS ID) field, and three bytes reserved (RES) field for future use, and
wherein the payload part has a maximum length of 65535 bytes.

7. The method of claim 1, wherein the Auxiliary MB application is for communication of a given VCP packet having a standard MBIM command or a non-standard MBIM command, respectively, mapped to and from a standard AT command or non-standard AT command.

8. The method of claim 1, wherein the Auxiliary MB application is for communication of a given VCP packet having a standard AT command or a non-standard AT command for which mapping is not performed in the data encoder/decoder.

9. The method of claim 1, further comprising:
controlling, by the processing device,
(A) when a AT command is determined to be encoded as the VCP packet, an MBIM Command Manager of the Client Data encoder/decoder to map the AT command to an equivalent MBIM Command ID (CID) packet and provide the MBIM CID packet for routing to the WWAN Interface Handler;
(B) when the MBIM CID packet is determined to be supported by the MB application, routing the MBIM CID packet from the WWAN Interface Handler to the MB application via the VTPTD, which routes the MBIM CID command packet to the WWAN service via the VTDI and the VNIC, wherein the VNIC routes the MBIM CID packet to the WWAN service via a Mini-Port Driver (MPD) of the VNIC, a Network Driver Interface Specification (NDIS) and a NDIS User mode Input/Output (UIO) of the client device, wherein the NDIS is communicatively coupled with the MPD and the NDIS UIO, wherein the NDIS UIO is communicatively coupled with the WWAN service, wherein the WWAN service routes the MBIM CID packet to the MB Application via the MB API; and
(C) when the MBIM CID packet is determined not to be supported by the MB application, routing the VCP packet with the MBIM CID packet as an auxiliary MBIM packet to a Client Application Interface of the MB client service, which routes the VCP packet with the auxiliary MBIM packet to the Auxiliary MB application.

10. The method of claim 9, wherein a Packet Router of the MS Client Service, which is communicatively coupled to the Decoder/Encoder and the WWAN Interface Handler, routes the MBIM CID packet to the WWAN Interface Handler or the auxiliary MBIM packet to the Client Application interface.

11. The method of claim 9, further comprising:
controlling, by the processing device, when the MB application sends a second MBIM CID packet,
routing the second MBIM CID packet through the MB API, the WWAN Service, the NDIS UIO, the NIDS, the MPD, the VNIC, the VTDI and the VTPTD, to the WWAN Interface Handler, and from the WWAN Interface Handler to the Encoder/Decoder,
mapping, by the Client Data Encoder/Decoder, the second MBIM CID packet to a corresponding AT command control flow VCP packet, and
routing the corresponding AT command control flow VCP packet through the Client Socket Interface to the first device driver, which communicates the corresponding AT command control flow VCP packet to the mobile hotspot device over the WLAN with the corresponding AT command MBIM control flow VCP packet as a second payload part.

12. The method of claim 11, wherein a Packet Router of the MS Client Service, which is communicatively coupled with the Client Data Decoder/Encoder and the WWAN Interface Handler, routes the second MBIM CID packet from the WWAN Interface Handler to the Encoder/Decoder.

13. The method of claim 9, further comprising:
controlling, by the processing device, when the auxiliary MB application sends a second auxiliary MBIM CID packet,
routing the second auxiliary MBIM CID packet to the Encoder/Decoder,
mapping, by the Client Data Encoder/Decoder, the second auxiliary MBIM CID packet to a corresponding AT command control flow VCP packet, and
routing the corresponding AT command control flow VCP packet through the Client Socket Interface to the first device driver, which communicates the corresponding AT command control flow VCP packet to the mobile hotspot device over the WLAN to provide Auxiliary MBIM CID information.

14. The method of claim 13, wherein the second auxiliary MBIM CID packet is routed through the client application interface to a Packet Router of the MS Client Service, which is communicatively coupled with the Client Data Decoder/Encoder, the WWAN Interface Handler and client application interface, and which routes the second auxiliary MBIM packet to the Encoder/Decoder.

15. The method of claim 1, wherein the first interface is a Wireless Local Area Network (WLAN), a Secure Digital Input Output (SDIO), a Universal Serial Bus (USB), a Universal Asynchronous Receiver/Transmitter, an Inter-Integrated Circuit (I2C) bus, or a General Purpose Input/Output (GPIO) lines interface.

16. The method of claim 1,
wherein the MB Application and the Auxiliary MB Application are integrated into an enhanced MB Application.

17. The method of claim 16, wherein the enhanced MB application is coupled to the Client data encoder/decoder via a client application interface which is communicatively coupled to a packet router, the packet router being communicatively coupled to the data encoder/decoder and the WWAN interface handler, the packet router and the client application interface being of the MB client service.

18. An apparatus for virtually connecting a mobile broadband (MB) device of a mobile hotspot device with a client device through a first interface of the client device, the apparatus comprising:
circuitry configured to control:
creating a path for routing a command control flow related packet from a first device driver of the first interface to (i) a MB application via a Wireless Wide Area Network (WWAN) Service of the client device, in which the WWAN Service is for communicatively coupling the first device driver to the MB application via a MB Application Programming Interface (API) of the client device which is communicatively coupled with the MB application and the WWAN service, or (ii) an auxiliary MB application of the client device,
wherein the path includes a Client Socket Interface and a Client Data Encoder/Decoder of a MB Client Service included in the client device, wherein the Client Socket Interface is communicatively coupled with the Client Data Encoder/Decoder and the first device driver,
wherein the Client Data Encoder/Decoder is communicatively coupled with a Wireless Wide Area Network (WWAN) Interface Handler of the MB Client Service, wherein the WWAN Interface Handler is for communicating with the WWAN Service via a Virtual Target Pass through Driver (VTPTD) of the client device,
wherein a Virtual Target Device Interface (VTDI) of the client device is for communicating with the VTPTD and a Virtual Network Interface Card (VNIC) Device Driver, in which the VNIC device driver is included in a second device driver of the client device at a second interface of the client device, and
in which the MB Client Service is for communicatively coupling the first device driver with the MB application and the Auxiliary MB application, and communicating a given command control flow related packet between the first device driver and the MB application or the auxiliary MB application, in which the given command control flow related packet has an AT command, a MB Interface Model (MBIM) or user defined format;
encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional payload part; and
determining by the Client Data Encoder/Decoder whether the given control flow packet from the first interface encoded as the VCP packet is for the WWAN interface Handler, and based on the determination controlling communication of the VCP packet to the MB application or the Auxiliary MB application.

19. The apparatus of claim 18,
wherein the circuitry is configured to control,
(A) when a AT command is determined to be encoded as the VCP packet, an MBIM Command Manager of the Client Data encoder/decoder to map the AT command to an equivalent MBIM Command ID (CID) packet and provide the MBIM CID packet for routing to the WWAN Interface Handler;
(B) when the MBIM CID packet is determined to be supported by the MB application, routing the MBIM CID packet from the WWAN Interface Handler to the MB application via the VTPTD, which routes the MBIM CID command packet to the WWAN service via the VTDI and the VNIC, wherein the VNIC routes the MBIM CID packet to the WWAN service via a Mini-Port Driver (MPD) of the VNIC, a Network Driver Interface Specification (NDIS) and a NDIS User mode Input/Output (UIO) of the client device, wherein the NDIS is communicatively coupled with the MPD and the NDIS UIO, wherein the NDIS UIO is communicatively coupled with the WWAN service, wherein the WWAN service routes the MBIM CID packet to the MB Application via the MB API; and (C) when the MBIM CID packet is determined not to be supported by the MB application, routing the VCP packet with the MBIM CID packet as an auxiliary MBIM packet to a Client Application Interface of the MB client service, which routes the VCP packet with the auxiliary MBIM packet to the Auxiliary MB application.

20. A wireless communication device comprising:

a receiver to receive a wireless communication; and a processing device configured for virtually connecting a mobile broadband (MB) device of a mobile hotspot device with the wireless communication device through a first interface of the wireless communication, wherein the processing device is configured to control:

creating a path for routing a command control flow related packet from a first device driver of the first interface to (i) a MB application via a Wireless Wide Area Network (WWAN) Service of the wireless communication device, in which the WWAN Service is for communicatively coupling the first device driver to the MB application via a MB Application Programming Interface (API) of the wireless communication device which is communicatively coupled with the MB application and the WWAN service, or (ii) an auxiliary MB application of the wireless communication device, wherein the path includes a Client Socket Interface and a Client Data Encoder/Decoder of a MB Client Service included in the wireless communication device, wherein the Client Socket Interface is communicatively coupled with the Client Data Encoder/Decoder and the first device driver, wherein the Client Data Encoder/Decoder is communicatively coupled with a Wireless Wide Area Network (WWAN) Interface Handler of the MB Client Service, wherein the WWAN Interface Handler is for communicating with the WWAN Service via a Virtual Target Pass through Driver (VTPTD) of the wireless communication device, wherein a Virtual Target Device Interface (VTDI) of the client device is for communicating with the VTPTD and a Virtual Network Interface Card (VNIC) Device Driver, in which the VNIC device driver is included in a second device driver of the wireless communication device at a second interface of the wireless communication device, and in which the MB Client Service is for communicatively coupling the first device driver with the MB application and the Auxiliary MB application, and communicating a given command control flow related packet between the first device driver and the MB application or the auxiliary MB application, in which the given command control flow related packet has an AT command, a MB Interface Model (MBIM) or user defined format;

encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional payload part; and determining by the Client Data Encoder/Decoder whether the given control flow packet from the first interface encoded as the VCP packet is for the WWAN interface Handler, and based on the determination controlling communication of the VCP packet to the MB application or the Auxiliary MB application.

\* \* \* \* \*